US012786909B2

(12) United States Patent
Cheng

(10) Patent No.: US 12,786,909 B2
(45) Date of Patent: Nov. 3, 2026

(54) METHOD AND APPARATUS FOR ACCESSING LONG PERIODICITY CELLS FOR NETWORK ENERGY SAVING

(71) Applicant: MEDIATEK INC., Hsinchu City (TW)

(72) Inventor: Chien-Chun Cheng, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 276 days.

(21) Appl. No.: 18/706,360

(22) PCT Filed: Mar. 1, 2023

(86) PCT No.: PCT/CN2023/079032
§ 371 (c)(1),
(2) Date: Apr. 30, 2024

(87) PCT Pub. No.: WO2023/165520
PCT Pub. Date: Sep. 7, 2023

(65) Prior Publication Data

US 2025/0016700 A1 Jan. 9, 2025

Related U.S. Application Data

(60) Provisional application No. 63/315,594, filed on Mar. 2, 2022.

(51) Int. Cl.
*H04W 56/00* (2009.01)
*H04W 36/08* (2009.01)
(Continued)

(52) U.S. Cl.
CPC ....... *H04W 56/0015* (2013.01); *H04W 36/08* (2013.01); *H04W 48/08* (2013.01); *H04W 74/0833* (2013.01); *H04W 76/20* (2018.02)

(58) Field of Classification Search
CPC .......................... H04W 56/0015; H04W 36/08
See application file for complete search history.

(56) References Cited

U.S. PATENT DOCUMENTS

2019/0363809 A1 11/2019 Yoon
2020/0015236 A1 1/2020 Kung
(Continued)

FOREIGN PATENT DOCUMENTS

CN 105580411 A 5/2016
WO 2020168120 A1 8/2020
WO 2022033517 A1 2/2022

OTHER PUBLICATIONS

Extended European Search Report dated Nov. 26, 2025, issued in application No. EP 23762918.3.
(Continued)

*Primary Examiner* — Zhiren Qin
(74) *Attorney, Agent, or Firm* — McClure, Qualey & Rodack, LLP

(57) ABSTRACT

Various solutions for accessing long periodicity cells for network energy saving with respect to user equipment and network apparatus in mobile communications are described. An apparatus may receive at least one information associated with a long-periodicity (LP) cell from a network node in a normal cell. The apparatus may perform a synchronization signal block (SSB)-based measurement according to the information to detect the LP cell. The apparatus may perform an access procedure with the LP cell.

18 Claims, 13 Drawing Sheets

(51) Int. Cl.

| | |
|---|---|
| ***H04W 48/08*** | (2009.01) |
| ***H04W 74/0833*** | (2024.01) |
| ***H04W 76/20*** | (2018.01) |

(56) References Cited

U.S. PATENT DOCUMENTS

| | | | | |
|---|---|---|---|---|
| 2020/0187104 | A1 | 6/2020 | Harada | |
| 2020/0229115 | A1 | 7/2020 | Qi | |
| 2021/0051672 | A1 | 2/2021 | Rastegardoost | |
| 2021/0120486 | A1 | 4/2021 | Onaka | |
| 2021/0297169 | A1 | 9/2021 | Yoon | |
| 2021/0329546 | A1 | 10/2021 | Wang | |
| 2022/0022269 | A1* | 1/2022 | Shi | H04W 72/044 |
| 2022/0150850 | A1* | 5/2022 | Visoz | H04W 36/0077 |
| 2022/0247529 | A1* | 8/2022 | Takeda | H04L 5/0048 |
| 2022/0279427 | A1* | 9/2022 | Hwang | H04W 48/12 |
| 2022/0312247 | A1* | 9/2022 | Cui | H04B 17/328 |
| 2023/0026600 | A1* | 1/2023 | Xie | H04W 56/00 |
| 2023/0047987 | A1* | 2/2023 | Tseng | H04W 36/08 |
| 2023/0284065 | A1* | 9/2023 | Zhou | H04B 17/30<br>370/252 |
| 2024/0267849 | A1* | 8/2024 | Lu | H04W 76/19 |

OTHER PUBLICATIONS

Orange; “NR enhancements for Advanced Sleep Modes;” Mar. 2019; pp. 1-7.

International Search Report and Written Opinion dated May 19, 2023, issued in application No. PCT/CN2023/079032.

Samsung; “SS Periodicity;” 3GPP TSG RAN WG1#88 R1-1702903; Feb. 2017; pp. 1-7.

3GPP TS 38.311 V16.7.0; “Technical Specification Group Radio Access Network; NR; Radio Resource Control (RRC) protocol specification (Release 16);” Dec. 2021; pp. 1-963.

Chinese language office action dated Mar. 20, 2024, issued in application No. TW 112107552.

* cited by examiner

METHOD AND APPARATUS FOR ACCESSING LONG PERIODICITY CELLS FOR NETWORK ENERGY SAVING

CROSS REFERENCE TO RELATED PATENT APPLICATION(S)

The present disclosure claims the priority benefit of U.S. Provisional Patent Application No. 63/315,594, filed on 2 Mar. 2022. The contents of aforementioned applications are herein incorporated by reference in their entirety.

TECHNICAL FIELD

The present disclosure is generally related to mobile communications and, more particularly, to accessing long periodicity (LP) cells for network energy saving with respect to user equipment (UE) and network apparatus in mobile communications.

BACKGROUND

Unless otherwise indicated herein, approaches described in this section are not prior art to the claims listed below and are not admitted as prior art by inclusion in this section.

The $5^{th}$ generation (5G) network, despite its enhanced energy efficiency in bits per Joule (e.g., 417% more efficiency than a 4G network) due to its larger bandwidth and better spatial multiplexing capabilities, could consume over 140% more energy than a 4G network.

For low traffic load, the common signal may dominate network's power consumption. For example, up to 30% of symbols for frequency range 1 (FR1) and 15% of symbols for frequency range 2 (FR2) are active in time for the network only to transmit synchronization signal block (SSB) and SystemInformationBlockType1 (SIB1). As a result, 5G base station (BS) consumes a large amount of energy even when the load is almost zero (e.g., only SSB and system information (SI) transmissions are ongoing).

For energy saving, 5G network can deploy long periodicity (LP) cells with SSB periodicity larger than the default value of 20 milliseconds (ms). The LP cells may potentially achieve 200% power-saving gain using advanced sleep modes. A normal cell may enter low power idle via switching to an LP cell for reducing always-on signal. However, UE could not access LP cell by the current initial cell selection procedure because an SSB periodicity longer than 20 ms does not meet UE's assumption.

Accordingly, how to reduce network energy consumption and improve energy efficiency becomes an important issue for the newly developed wireless communication network. Therefore, there is a need to provide proper schemes for accessing LP cells for UE.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to assessing long periodicity cells for network energy saving with respect to user equipment and network apparatus in mobile communications.

In one aspect, a method may involve an apparatus receiving at least one information associated with an LP cell from a network in a normal cell. The method may also involve the apparatus performing an SSB-based measurement according to the information to detect the LP cell. The method may further involve the apparatus performing an access procedure with the LP cell In one aspect, a method may involve an apparatus establishing a connection with a UE in a normal cell. The method may also involve the apparatus transmitting at least one information associated with an LP cell to the UE for performing an access procedure with the LP cell.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to using on-demand reference signal for network energy saving with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

The present disclosure proposes several schemes pertaining to accessing LP cells for network energy saving with respect to UE and network apparatus in mobile communications. A network node may deploy a normal cell using the default SSB periodicity of 20 ms. The normal cell provides wide coverage and ensures the LP cells are fully overlaid.

Figure 1:
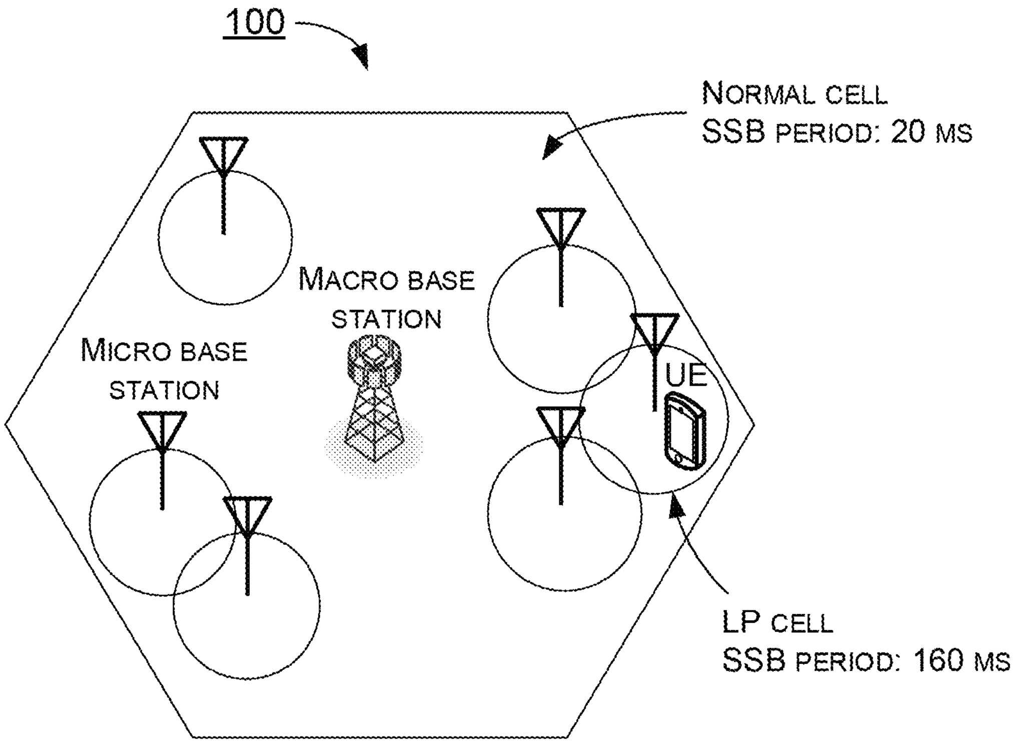
FIG. 1 is a diagram depicting an example scenario of coverage of normal cell under schemes in accordance with implementations of the present disclosure

FIG. 1 illustrates an example scenario 100 of coverage of normal cell under schemes in accordance with implementations of the present disclosure. Scenario 100 involves a plurality of network nodes (e.g., a macro base station and multiple micro base stations) and a UE, which may be a part of a wireless communication network (e.g., an LTE network, a 5G/NR network, an IoT network or a 6G network). The service provider may deploy the normal cell with SSB periodicity of 20 ms and deploy the LP cells with SSB periodicity of 160 ms. The coverage of the normal cell may overlap the coverage of the LP cells.

In accordance with implementations of the present disclosure, the UE may obtain an SSB from the normal cell or the LP cell. For example, the UE may receive SSB from the LP cell. In another example, the UE may receive SSB from the normal cell and the UE may assume the received SSB is the same as the LP cell. Then, the UE may access to the LP cell according to the received SSB.

There may be two ways to access a LP cell. In one way (alternative 1), the UE may connect to the normal cell. In the other way (alternative 2), the UE may camps on the normal cell.

Figure 2:
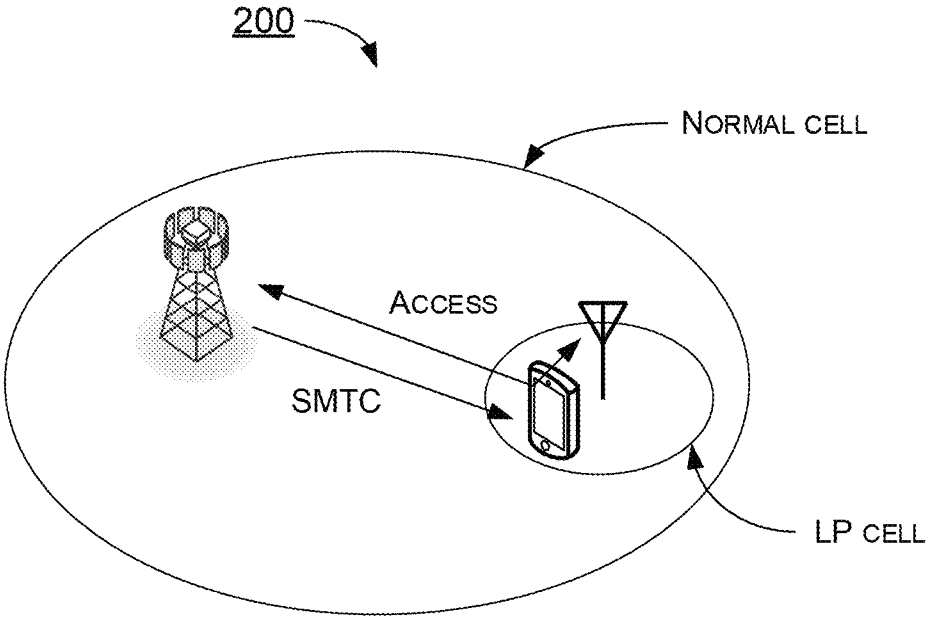
FIG. 2 is a diagram depicting an example scenario of alternative 1 for accessing LP cell under schemes in accordance with implementations of the present disclosure.

FIG. 2 illustrates an example scenario 200 of alternative 1 for accessing LP cell under schemes in accordance with implementations of the present disclosure. Scenario 200 involves a plurality of network nodes (e.g., a macro base station and a micro base station) and a UE, which may be a part of a wireless communication network (e.g., an LTE network, a 5G/NR network, an IoT network or a 6G network). Scenario 200 illustrates an example of alternative 1 for accessing the LP cell. For alternative 1, the UE may establish a radio resource control (RRC) connection via the normal cell by the initial cell search procedure. Once the UE establish the RRC connection successfully, the network node may provide access to a long-periodicity cell by one of the following procedure: (1) handover (HO), (2) conditional HO (CHO), (3) dual active protocol stack (DASP), (4) carrier arrogation (CA), Evolved Universal Terrestrial Radio Access (E-UTRA)-New Radio (NR) dual connectivity (EN-DC), and (6) NR-NR dual connectivity (NR-DC).

The access procedures of alternative 1 to the LP cell from the normal cell may be applicable only when the UE is in the RRC connected node (i.e., RRC_CONNECTED). The network node may be an NR gNB operated in frequency region 1 (FR1) or in frequency region 2 (FR2), or an LTE eNB.

Once the UE connects to the normal cell, the network node may provide measurement configurations to detect the LP cell via measuring the primary synchronization signal (PSS) and the secondary synchronization signal (SSS) of an SSB. The measurement configurations may be an intra-frequency measurement (e.g., a normal cell and an LP cell are both in frequency range 1 (FR1)) or an inter-frequency measurement (e.g., a normal cell is in FR1 and an LP cell is in second frequency range 2 (FR2)). After the UE sends the measurement report to the network node, the UE may receive access to the LP cell from the network node.

The UE in RRC connected mode (RRC_CONNECTED) may perform the intra-frequency measurements when the UE receives the measurement configurations via RRC messages from the network node. The measurement configurations may include SSB-based measurement timing configuration 1 (SMTC1) and SMTC2.

Figure 3:
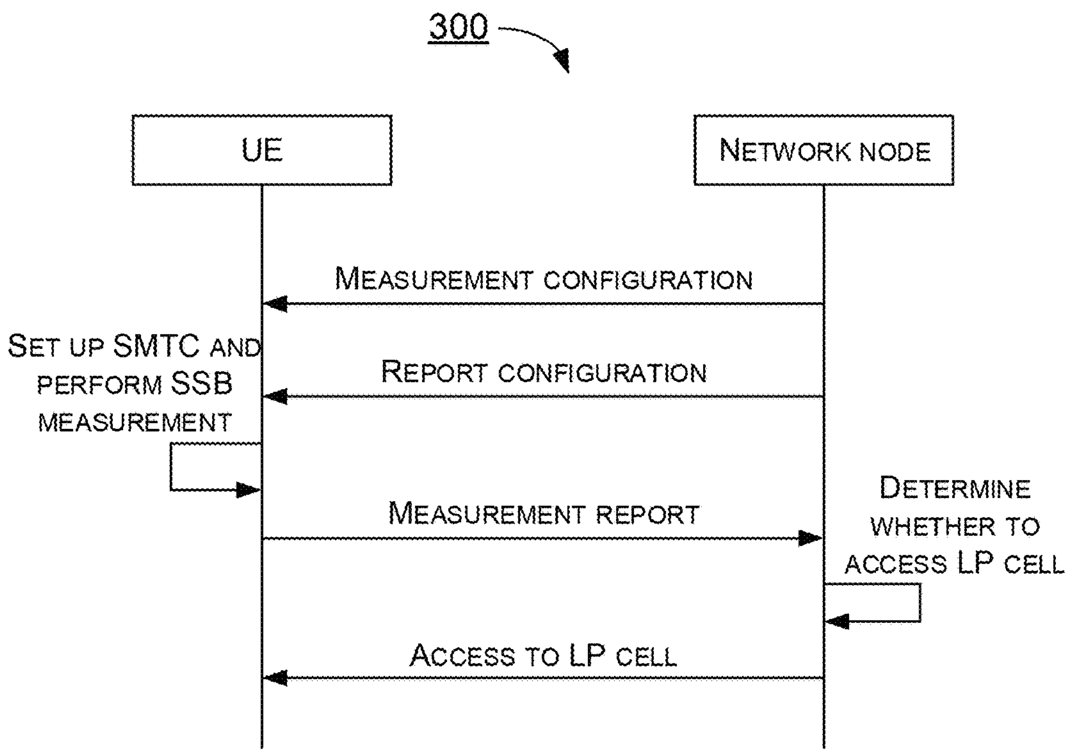
FIG. 3 is a diagram depicting an example scenario of access procedure associated with intra-frequency measurements under schemes in accordance with implementations of the present disclosure.

FIG. 3 illustrates an example scenario 300 of access procedure associated with intra-frequency measurements under schemes in accordance with implementations of the present disclosure. Scenario 300 involves a network node (e.g., gNB) and a UE, which may be a part of a wireless communication network (e.g., an LTE network, a 5G/NR network, an IoT network or a 6G network). Scenario 300 illustrates an example of intra-frequency measurement for LP cell. The UE may receive SMTC1 from the network node via RRC message. The SMTC1 is the first SMTC used as the primary measurement timing configuration. The SMTC1 may include periodicity, offset and duration. In order to detect the LP cell, the periodicity in SMTC1 may be set to 160 ms or a value larger than 20 ms. In addition, the UE may receive SMTC2 from the network node via RRC message. The SMTC 2 is the secondary SMTC. The SMTC2 may include periodicity and pci-List. The periodicity in SMTC2 may be shorter than the periodicity in SMTC1. The pci-List is used to indicate target cell identities (IDs) for SSB-based measurement. In order to maintain the serving cell, the periodicity in SMTC2 may be set to 20 ms or a value smaller than 20 ms. SMTC1 and SMTC2 may be included in a measurement configuration (e.g., measConfig) from the network node via the RRC message.

In one implementation, the UE may receive an indication of LP cells from the network node via RRC message associated with SMTC1 or SMTC2 configuration. The UE may enable some enhancement if supported, e.g., the UE may reduce the required measuring number.

In one implementation, the UE may receive a specific SMTC on top of SMTC1 and SMTC2. The specific SMTC may include periodicity, offset, duration, cell IDs, SSB-ToMeasure (i.e., a bit map for transmitted SSB in an SSB burst set) for the long-periodicity cells.

In one implementation, the specific SMTC may be requested by the UE via RRC message, activated or deactivated by UE or network node. The specific SMTC may be configured as a periodic gap or aperiodic gap. The gap activation and gap deactivation may be via downlink (DL) RRC or DL media access control (MAC) control element (MAC-CE) if it is based on NW-control. In addition, the gap activation and gap deactivation may be via uplink (UL) RRC or UL MAC CE if it is based on UE-control.

Referring to FIG. 3, the UE may receive a report configuration (e.g., reportConfig) from the network node via RRC message. The report configuration may include at least one of trigger quantities, i.e., reference signal received power (RSRP), reference signal received quality (RSRQ), signal to interference plus noise ratio (SINR), and EcN0, trigger types or events, i.e., eventTriggered, periodical, Event A1 (Serving becomes better than threshold), Event A2 (Serving becomes worse than threshold), Event A3 (neighbor becomes offset better than SpCell), Event A5 (SpCell becomes worse than threshold1 and neighbor becomes better than threshold2), etc.

The UE may set up the SMTC configuration based on SMTC1 and SMTC2. In the SMTC windows, the UE may perform SSB-based measurement. The UE may detect the LP cell via SSB-based measurement based on the measurement timing from SMTC1 or the new SMTC.

The UE may report the measurement report (e.g., the detected cell ID and the measured quantity indicated by the report configuration) to the network node via RRC. The measurement report reported via an RRC message is triggered by events or periodicity indicated by the report configuration.

The network node may determine whether the UE can access the LP cell. The UE may provide assistant information via RRC. The assistant information may include at least one of low-mobility evaluation, not-at-cell-edge evaluation, UE capability on camping on a long-periodicity cell, UE capability on accessing a long-periodicity cell, etc.

The UE may receive access to the LP cell from the network node via RRC. The access may comprise at least one of a handover (HO) message via Reconfiguration With-Sync, a secondary cell (SCell) addition message via SCell-Config and a dual-connectivity (DC) addition message via RRCReconfiguration. For example, the UE may receive another or updated SMTC for the LP cell. The SMTC may be carried in the HO, SCell addition, or DC addition messages and the SMTC may include periodicity, offset, and duration parameters. The periodicity of SMTC may be set to 160 ms or a value greater than 20 ms.

Figure 4:
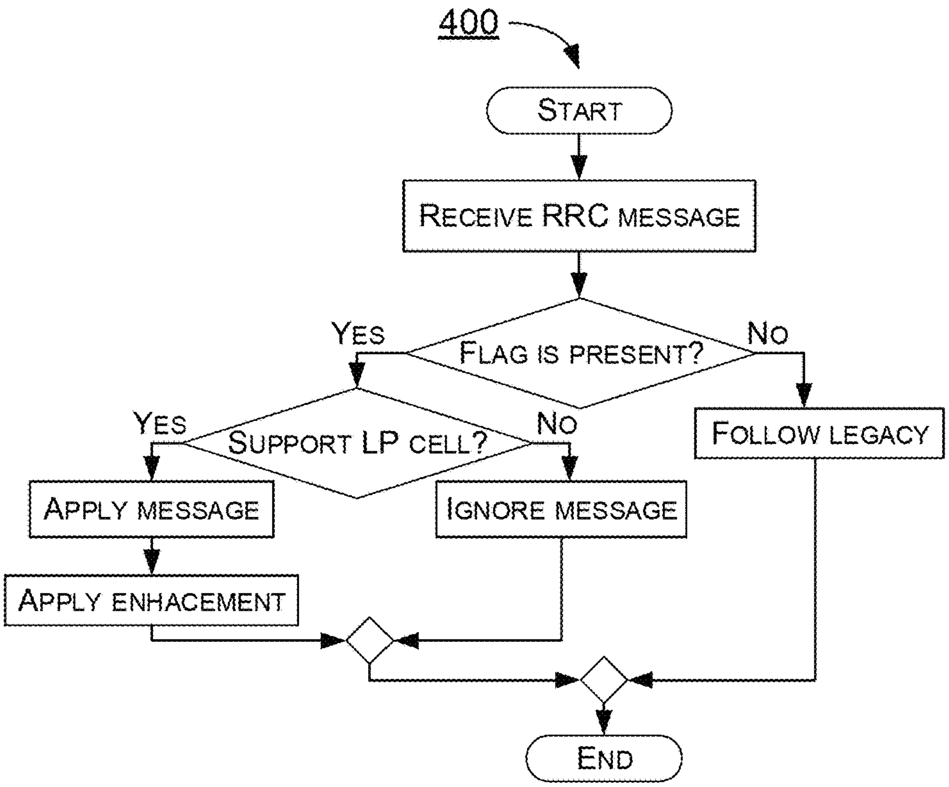
FIG. 4 is a diagram depicting an example scenario of one-bit flag to enable new UE behavior under schemes in accordance with implementations of the present disclosure.

FIG. 4 illustrates an example scenario 400 of one-bit flag to enable new UE behavior under schemes in accordance with implementations of the present disclosure. Scenario 400 involves a plurality of network nodes and a UE, which may be a part of a wireless communication network (e.g., an LTE network, a 5G/NR network, an IoT network or a 6G network). Scenario 400 illustrates an example on receiving an indication as a one-bit flag to enable new UE behavior via RRC. The UE may receive an indication via RRC as a one-bit flag to enable new UE behavior. For example, if the flag is present (i.e., the RRC information element (IE) field is present), the UE may apply the enhanced radio resources measurement (RRM) (e.g., the UE may reduce required measurement times) and demodulation process to access the long-periodicity cell with the SSB periodicity greater than 20 ms. In another example, the UE may skip or ignore the RRC messages when the flag is present if the UE cannot support the long-periodicity cells. The one-bit flag is optionally present. If the flag is absent, UE may follow the legacy procedures.

The UE in RRC connected mode (RRC_CONNECTED) may perform inter-frequency measurements when receiving measurement gap (MG) configurations via RRC messages. The MG configuration may include at least one of gapFR1, gapFR2, gaptwoFR1, and gaptwoFR2.

Figure 5:
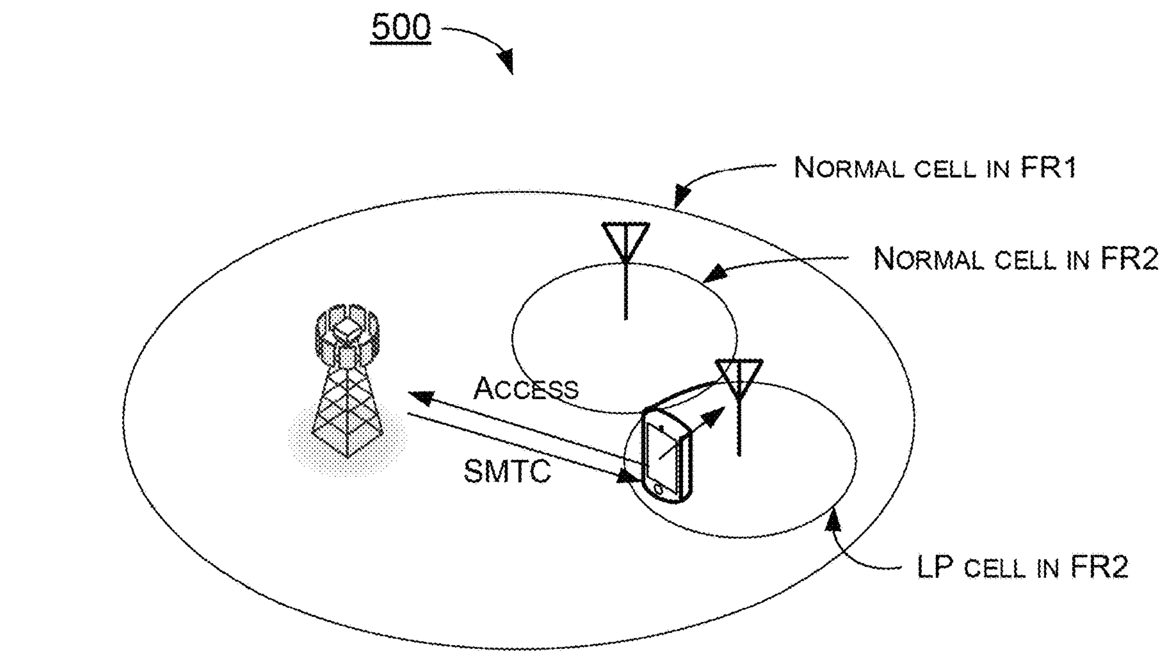
FIG. 5 is a diagram depicting an example scenario of inter-frequency measurements under schemes in accordance with implementations of the present disclosure.

FIG. 5 illustrates an example scenario 500 of inter-frequency measurements under schemes in accordance with implementations of the present disclosure. Scenario 500 involves a plurality of network nodes (e.g., a macro base station and two micro base stations) and a UE, which may be a part of a wireless communication network (e.g., an LTE network, a 5G/NR network, an IoT network or a 6G network). Scenario 500 illustrates an example on inter-frequency measurement for LP cell. In FIG. 5, the coverage cell (i.e., normal cell corresponding to the network node) is in FR1, and a target capacity cell is in FR2. In this case, one MG may be configured a single SSB periodicity of 160 ms or a value greater than 20 ms. However, if there are multiple target capacity cells in FR2 and different periodicities exist (e.g., 20 ms and 160 ms), various MGs may be needed. For example, the UE may receive gapFR2 and gaptwoFR2 with different periodicities.

Based on the scenario of FIG. 5, i.e., the coverage cell (i.e., normal cell corresponding to the network node) is in FR1, and two periodicities of SSB are required to be detected in FR2. The access procedure may be implemented as FIG. 6.

Figure 6:
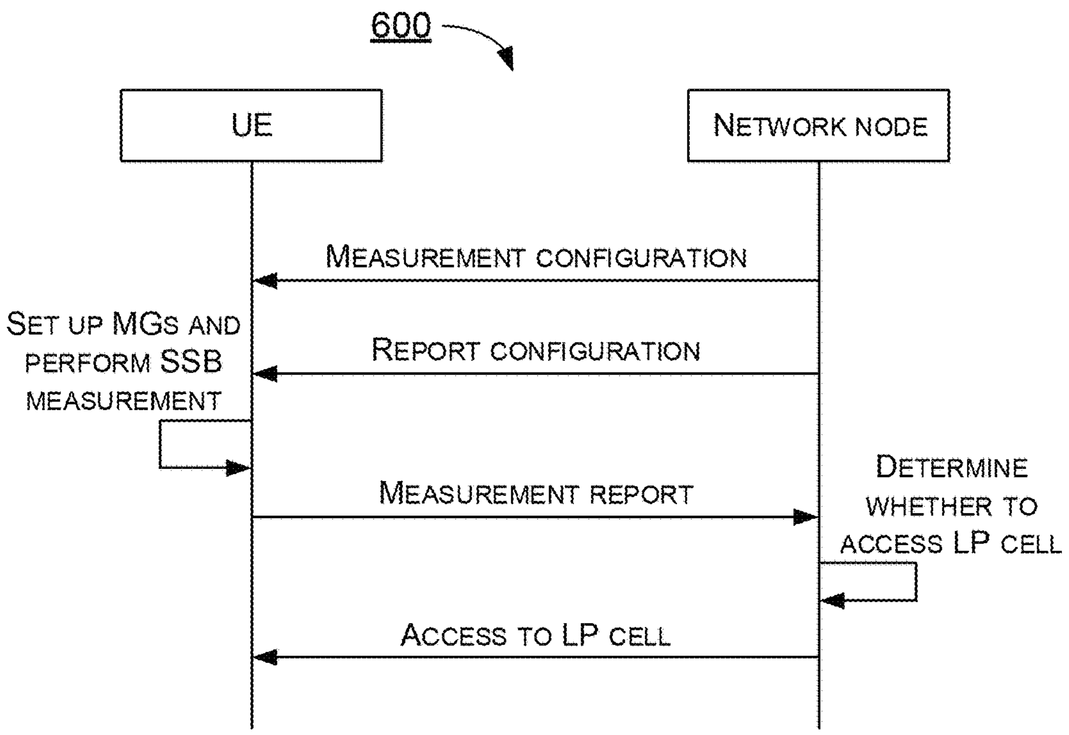
FIG. 6 is a diagram depicting an example scenario of access procedure associated with inter-frequency measurements under schemes in accordance with implementations of the present disclosure.

FIG. 6 illustrates an example scenario 600 of access procedure associated with inter-frequency measurements under schemes in accordance with implementations of the present disclosure. Scenario 600 involves a plurality of network nodes and a UE, which may be a part of a wireless communication network (e.g., an LTE network, a 5G/NR network, an IoT network or a 6G network). Scenario 600 illustrates an example on inter-frequency measurement for LP cell. The UE may receive MG configuration (e.g., measGapConfig) including from gapFR2 and gaptwoFR2 from the network node via RRC. The gapFR2 and gaptwoFR2 indicate measurement gap configuration that applies to FR2 only. The gapFR2 and gaptwoFR2 may include at least one of gapOffset (offset), mgl (length), mgrp (period), and mgta (timing advance), and measGapId (measurement gap ID). For example, the UE may receive an indication of long-period cells from the network node via RRC message associated with measurement gap configuration. The UE may enable the enhancement, e.g., the UE may reduce the required measuring number. In another example, the UE may receive a specific MG for the long-periodicity cells. The specific MG may be requested by the UE via RRC. The specific MG may be activated or deactivated by the UE or network node. In addition, the specific MG may be configured as a periodic gap or aperiodic gap. The gap activation and gap deactivation may be triggered via DL RRC or DL MAC-CE if the gap activation and gap deactivation are based on NW-control, and the gap activation and gap deactivation may be triggered via UL RRC or UL MAC CE if the gap activation and gap deactivation are based on UE-control.

The UE may receive a report configuration from the network node via RRC. The report configuration may include at least one of trigger quantities, i.e., RSRP, RSRQ, SINR, and EcN0, trigger types or events, i.e., eventTriggered, periodical, Event A1, Event A2, Event A3, Event A5, etc. The UE may set up the SMTC configuration within the MG. In the MG windows, the UE may perform SSB-based measurement. The UE may detect the LP cell via SSB-based measurement based on the measurement timing from gapFR2, gaptwoFR2, or the new MG. The UE may report the measurement report (e.g., the detected cell ID and the measured quantity indicated by the report configuration) to the network node via RRC. The measurement report reported via an RRC message is triggered by events or periodicity indicated by the report configuration.

The network node may determine whether the UE can access the LP cell. The UE may provide assistant information via RRC. The assistant information may include at least one of low-mobility evaluation, not-at-cell-edge evaluation, UE capability on camping on a long-periodicity cell, UE capability on accessing a long-periodicity cell, etc.

The UE may receive access to the LP cell from the network node via RRC. The access may be a HO message via Reconfiguration WithSync, an SCell addition message via SCellConfig, or a DC addition message via RRCReconfiguration. For example, the UE may receive another or updated SMTC or MG for the LP cell. The SMTC or MG may be carried in the HO, SCell addition, or DC addition messages. The SMTC or MG may include periodicity, offset, and duration parameters. The periodicity of SMTC or MG may be set to 160 ms or a value greater than 20 ms.

In addition, the UE may receive an indication via RRC as a one-bit flag to enable new UE behavior. For example, if the flag is present (i.e., the RRC information element (IE) field is present), the UE may apply the enhanced radio resources measurement (RRM) (e.g., the UE may reduce required measurement times) and demodulation process) to access the long-periodicity cell with the SSB periodicity greater than 20 ms. In another example, the UE may skip or ignore the RRC messages when the flag is present if the UE cannot support the long-periodicity cells. The one-bit flag is optionally present. If the flag is absent, UE may follow the legacy procedures.

For RRC_CONNECTED inter-frequency measurement, the MG is needed if the UE cannot measure intra-frequency band and inter-frequency band simultaneously. However, when one MG per FR is supported, but the case of UE in FR1 needing to detect a normal cell and an LP cell in FR2 is not supported, at least two MGs per FR2 may be required. If only one gap is configured for 160 ms, the UE may measure both 20 ms and 160 ms of SSB periodicity. However, the time period for PSS/SSS detection may take 800 ms as a penalty (assume Kp=1 and CSSF_intra=1). On the other hand, if the gap is configured for 20 ms, the UE cannot detect the SSB periodicity of 160 ms because the UE shall complete the PSS/SSS detection every max (600 ms, 100 ms)=600 ms.

In an example, the concurrent gap may be supported and the multiple simultaneous and independent measurement gaps may be provided. For radio resources measurement (RRM), the UE may be configured two gaps per-FR1, per-FR2, or per-UE via RRC IE MeasGapConfig by configuring gapTwoFR1, gapTwoFR2, or gapTwoUE. For the association between concurrent MG and measured frequencies, the gap IDs have been introduced in mobile originating (MO). However, the concurrent gap only supports standalone NR. The concurrent gap cannot support a case when LTE base stations are deployed for the coverage layer, and NR base stations are used for the capacity layer. In addition, in the example, the UE cannot request, activate, and deactivate the concurrent gap and the aperiodic or semi-persistent gap is not supported.

In order to solve the above issues for the RRC_CONNECTED inter-frequency measurement. The present disclosure proposes some solutions to resolve the issues below.

Figure 7:
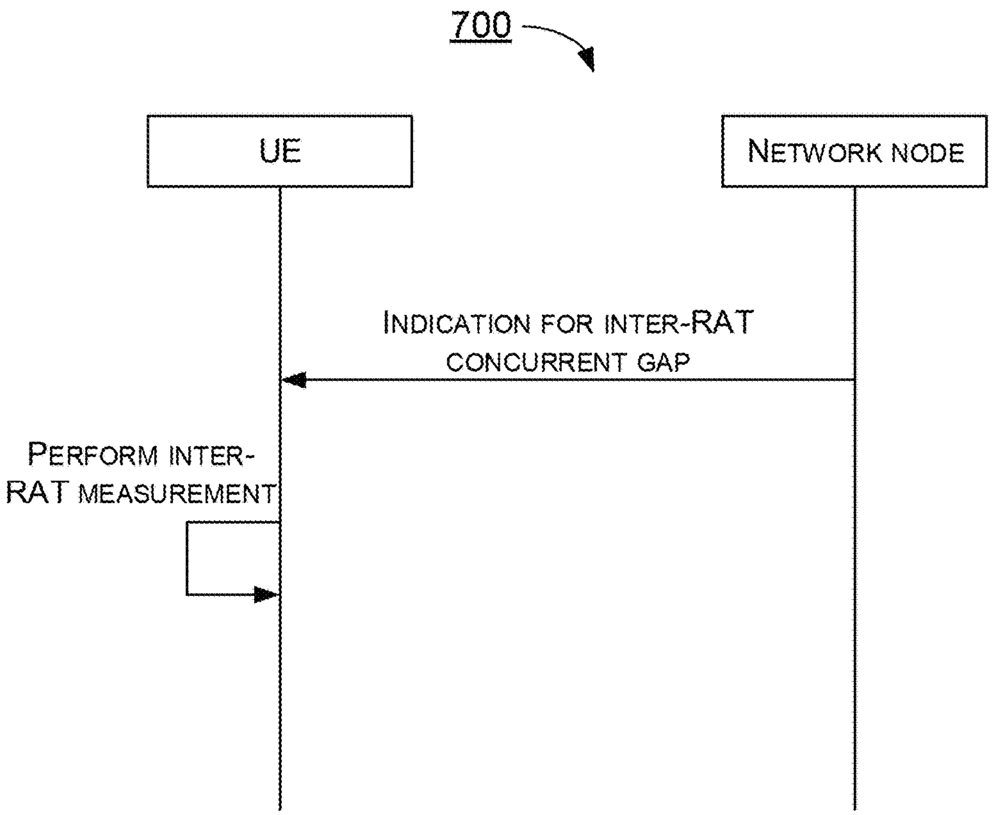
FIG. 7 is a diagram depicting an example scenario of configuration for inter-frequency measurement under schemes in accordance with implementations of the present disclosure.

FIG. 7 illustrates an example scenario 700 of configuration for inter-frequency measurement under schemes in accordance with implementations of the present disclosure. Scenario 700 involves a plurality of network nodes and a UE, which may be a part of a wireless communication network (e.g., an LTE network, a 5G/NR network, an IoT network or a 6G network). Scenario 700 illustrates an example on configuration for the inter-frequency measurement. The UE may receive an RRC message from the network node. The RRC message may provide configurations of gaptwoFR1, gaptwoFR2, and gapTwoUE. The configurations may include at least one of gapOffset (offset), mgl (length), mgrp (period), and mgta (timing advance), and measGapId (measurement gap ID) for inter-radio access technology (RAT) measurement. To differentiate the inter-RAT concurrent gap and the legacy, the 1-bit indication in gap configuration (e.g., gapConfig) is added to indicate the inter-RAT concurrent gap. The UE may receive the indication for the inter-RAT concurrent gap from network node via SIB or RRC messages. The UE may request, activate, or deactivate a concurrent gap for inter-RAT and inter-frequency measurement when the indication is present.

Figure 8:
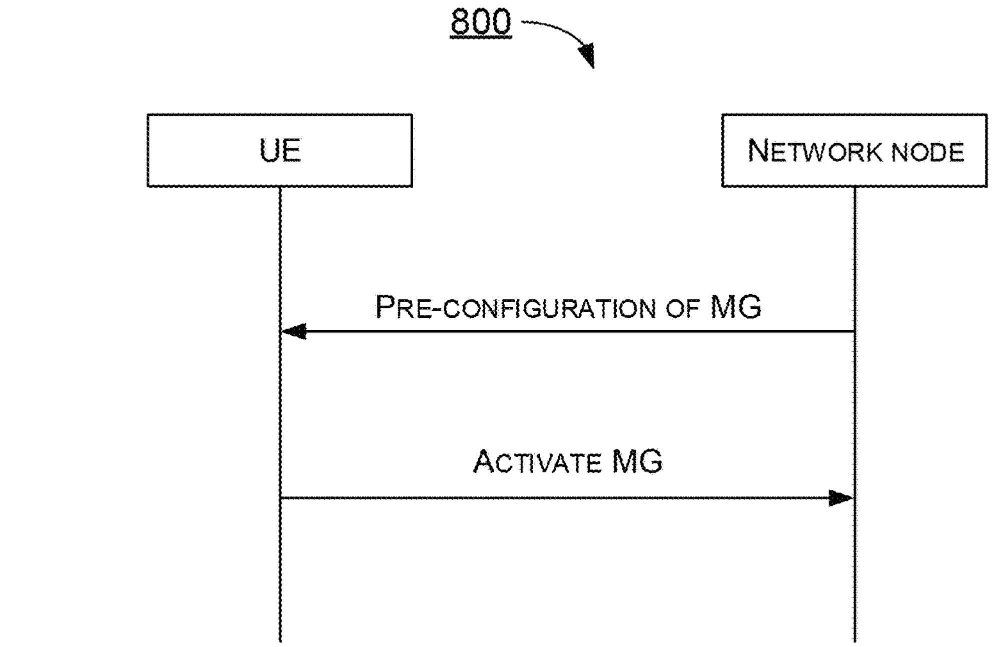
FIG. 8 is a diagram depicting an example scenario of configuration for inter-frequency measurement under schemes in accordance with implementations of the present disclosure.

FIG. 8 illustrates an example scenario 800 of configuration for inter-frequency measurement under schemes in accordance with implementations of the present disclosure. Scenario 800 involves a plurality of network nodes and a UE, which may be a part of a wireless communication network (e.g., an LTE network, a 5G/NR network, an IoT network or a 6G network). Scenario 800 illustrates an example on configuration for the inter-frequency measurement. If the RRC message from the network node configures the pre-configuration of MGs (e.g., pre-configured concurrent gap), the UE may activate (or deactivate) an MG (e.g., concurrent gap) via a UL MAC CE command or a UL RRC message.

The UE may use a UL RRC message (e.g., UEAssistanceInformation) to request a concurrent gap. The UE may indicate the expected gap configuration of a periodic, semi-persistent (SP), or aperiodic (AP) gap in the UL RRC message. The UE may require multiple attempts to read MIB/SIB1 from an LP cell when using an SP or AP gap.

Figure 9:
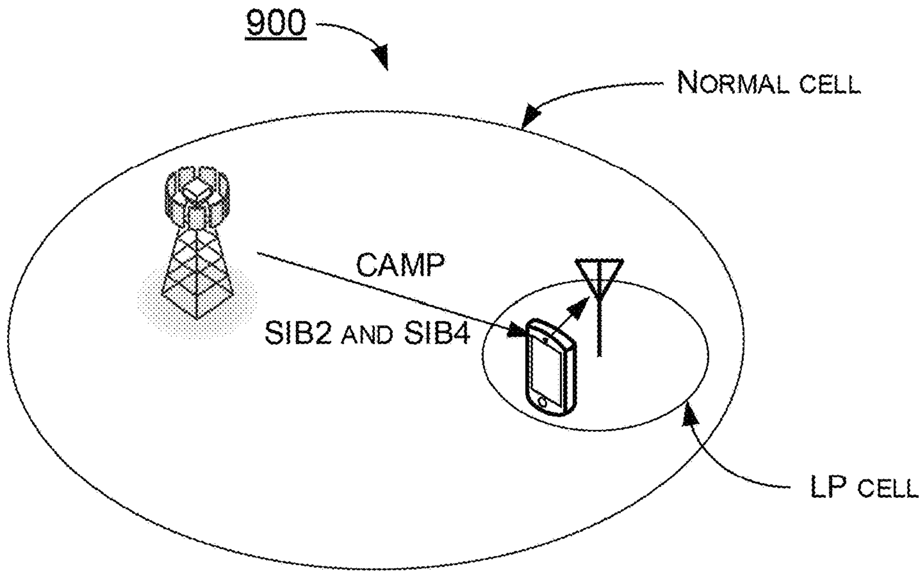
FIG. 9 is a diagram depicting an example scenario of alternative 2 for accessing LP cell under schemes in accordance with implementations of the present disclosure.

FIG. 9 illustrates an example scenario 900 of alternative 2 for accessing LP cell under schemes in accordance with implementations of the present disclosure. Scenario 900 involves a plurality of network nodes (e.g., a macro base station and a micro base station) and a UE, which may be a part of a wireless communication network (e.g., an LTE network, a 5G/NR network, an IoT network or a 6G network). Scenario 900 illustrates an example on the alternative 2 for accessing LP cell. For alternative 2, the UE may camp on the normal cell and read the system information (SI) broadcasted by the normal cell. If the SI contains the SS/PBCH block (SSB) measurement timing configuration (SMTC) for the LP cell, the UE may detect the SSB of the LP cell based on the SMTC and perform the random access procedure to access the LP cell.

The access procedure of alternative 2 is applicable only when the UE is in RRC_IDLE mode or RRC_INACTIVE mode. The SMTC information for the LP cell could be provided in RRC_IDLE mode and RRC_INACTIVE mode, but it is up to the UE. The UE may determine whether the UE should access the LP cell.

The UE in RRC_IDLE mode may perform the cell selection process after the UE has switched on and selected a public land mobile network (PLMN). The cell selection process allows the UE to select a suitable cell, e.g., a normal cell, to camp on to access available services. In the cell selection process, the UE can use stored information (stored information cell selection) or not (initial cell selection).

When the UE is in either camped normally state or camped on any cell state on a serving cell, the UE may perform the cell reselection procedure that allows the UE to select a more suitable cell and camp on it. The UE may attempt to detect, synchronize, and monitor intra-frequency, inter-frequency, and inter-radio access technology (RAT) cells indicated by the serving cell, i.e., the normal cell. For inter-frequency measurement, the UE may receive SystemInformationBlock Type4 (SIB4) broadcasted by the serving cell. The SIB4 may include SMTC and SMTC2-LP. For intra-frequency, the UE may receive SMTC and SMTC2-LP from SIB2. The periodicity of SMTC and SMTC2-LP may be set to 20 ms and 160 ms, respectively, to help the UE detect the LP cells.

Figure 10:
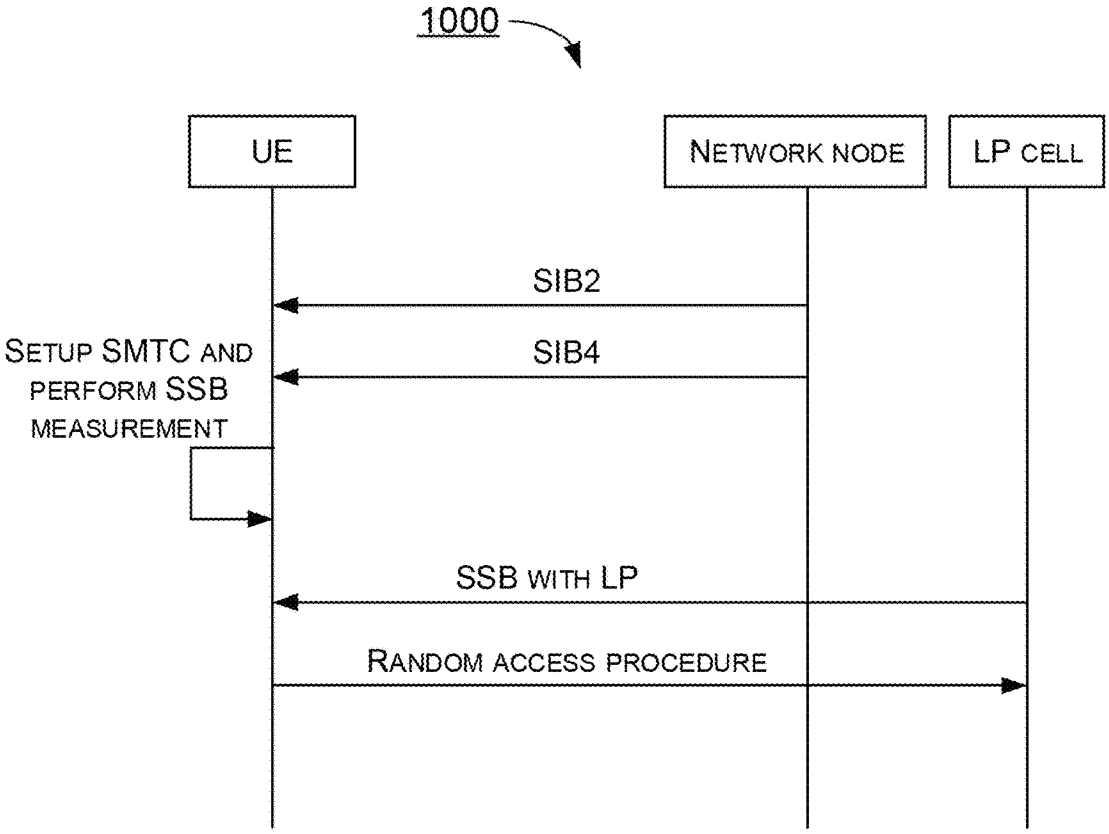
FIG. 10 is a diagram depicting an example scenario of access procedure associated with alternative 2 under schemes in accordance with implementations of the present disclosure.

FIG. 10 illustrates an example scenario 1000 of access procedure associated with alternative 2 under schemes in accordance with implementations of the present disclosure. Scenario 1000 involves a network node, a UE and an LP cell, which may be a part of a wireless communication network (e.g., an LTE network, a 5G/NR network, an IoT network or a 6G network). Scenario 1000 illustrates an example on access procedure associated with alternative 2 for LP cell. The UE in the camped state may receive SIB2. SIB2 may contain cell re-selection information for intra-frequency cell selection. The cell 1 re-selection information for intra-frequency cell selection may include intraFreqCellReselectionInfo. The SIB2 may provide the SMTC and SMTC2-LP. The SMTC may include periodicity, offset, and duration parameters, and the SMTC2-LP may provide pci-list and periodicity parameters. The periodicity of SMTC2-LP is longer than the periodicity of the SMTC. For example, the periodicity may be set to 20 ms for SMTC and set to 160 ms for SMTC2-LP.

The UE in the camped state may receive SIB4. SIB4 contains cell re-selection information for inter-frequency cell re-selection. The cell re-selection information for inter-frequency cell re-selection may include interFreqCellReselectionInfo. The SIB4 may provide the SMTC and SMTC2-LP. The SMTC may indicate periodicity, offset, and duration, and the SMTC2-LP may provide pci-list and periodicity longer than the periodicity of the SMTC. For example, the periodicity may be set to 20 ms for SMTC and set to 160 ms for SMTC2-LP. In an example, a new SMTC may be provided for network energy savings. The new SMTC may include periodicity, offset, duration, pci-list, ssb-ToMeasure, and flags to enable new cell reselection and symbol demodulation procedures. The periodicity may be set to a value greater than 160 ms.

In RRC_IDLE and RRC_INACTIVE, the UE may determine whether to set up the SMTC configuration based on SIB1, SIB2, and SIB4. In the SMTC windows, the UE may perform SSB-based measurement to detect the LP cell.

The UE may receive the PSS and SSS from the LP cell. The UE should acquire time and frequency synchronization with a cell and detect the physical layer Cell ID of the LP cell and an SS/PBCH block (SSB). Upon detecting an SSB, the UE may determine the master information block (MIB) and CORESET, and find SIB1. The UE may receive SIB1. SIB1 may provide a set of SS/PBCH block indexes, RSRP measurements, physical random access channel (PRACH) transmission parameters, PRACH preamble sequence set, and an indication to perform Type-1 random access (RA) or Type-2 RA procedure. For example, SIB1 may include a flag to indicate whether the cell is energy-saving or a cell ID list associated with the serving cells or the neighboring cells in the energy-saving state. The UE may determine whether to prioritize the cells in the list based on capability, mobility, and location status.

The UE may initial the Type-1 RA procedure or Type-2 L1 RA procedure. The Type-1 RA procedure may include the transmission of random access preamble (Msg1) in a PRACH and random access response (RAR) message with a physical downlink control channel (PDCCH)/physical downlink share channel (PDSCH) (Msg2). In addition, when the Type-1 RA procedure is applicable, the Type-1 RA procedure may further include the transmission of a PUSCH scheduled by a random access response (RAR) UL grant, and PDSCH for contention resolution. The Type-2 RA procedure may include the transmission of random access preamble in a PRACH, the transmission of a physical uplink share channel (PUSCH) (MsgA) and the reception of a RAR message with a PDCCH/PDSCH (MsgB). In addition, when the Type-2 RA procedure is applicable, the Type-2 RA procedure may further include the transmission of a PUSCH scheduled by a fallback RAR UL grant, and PDSCH for contention resolution. In an example, SIB1 may include a flag to indicate whether the cell is energy-saving. If the flag is present, the UE may prioritize the Type-2 RA procedure over the Type-1 RA procedure. For example, the UE cannot initiate a Type-1 RA procedure, and only fallback behavior is supported, i.e., the UE initiates a Type-2 RA procedure, and a fallback indication is received in MsgB.

SSB can be configured with a periodicity of 160 ms. However, MIB is always transmitted on the broadcast channel (BCH) with a periodicity of 80 ms and the repetitions of MIB may be made within 80 ms. In addition, when the SSB period is 160 ms, the MIB only changes content every 160 ms due to the 4 least significant bit (LSB) system frame number (SFN) bits are outside the MIB payload.

SIB1 can be configured with a periodicity of 160 ms, and the transmission repetition periodicity of SIB1 is up to network node implementation. However, when SSB and CORESET multiplexing pattern 1 is present, the SIB1 repetition transmission period is 20 ms. The SSB and CORESET multiplexing pattern 1 defines a rule for UE to find CORESET 0 during the initial cell search. However, in the energy-saving mode, the rule may lead to energy waste due to sending SIB1 every 20 ms.

In order to solve the above issues for the MIB period and SIB1 period. The present disclosure proposes some solutions by extending the MIB period and the SIB1 period to resolve the issues below.

Figure 11:
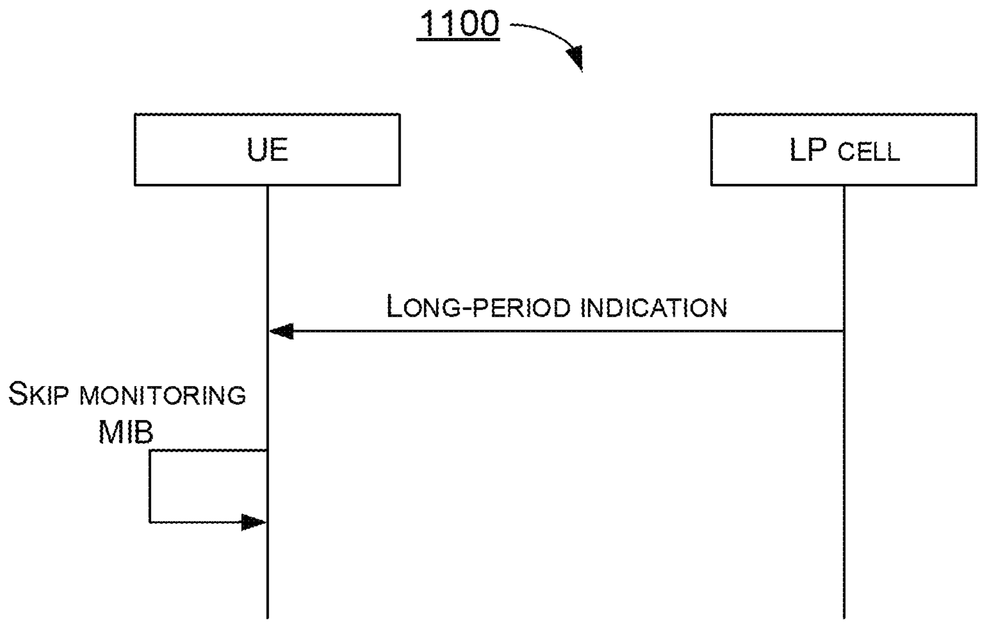
FIG. 11 is a diagram depicting an example scenario of extending MIB period under schemes in accordance with implementations of the present disclosure.

FIG. 11 illustrates an example scenario 1100 of extending MIB period under schemes in accordance with implementations of the present disclosure. Scenario 900 involves a LP cell and a UE, which may be a part of a wireless communication network (e.g., an LTE network, a 5G/NR network, an IoT network or a 6G network). Scenario 1100 illustrates an example on extending MIB period. The UE may receive a long-period indication (LPI) in system information, e.g., SIB1. If the LPI is present, a periodicity and repetitions of MIB may be configurable or be the same as the SSB period, rather than the default value of a periodicity of 80 ms and repetitions made within 80 ms. Furthermore, if the LPI is present, the UE may stop (or skip) monitoring MIB every 80 ms and follow the new configuration or association provided by the network node.

Figure 12:
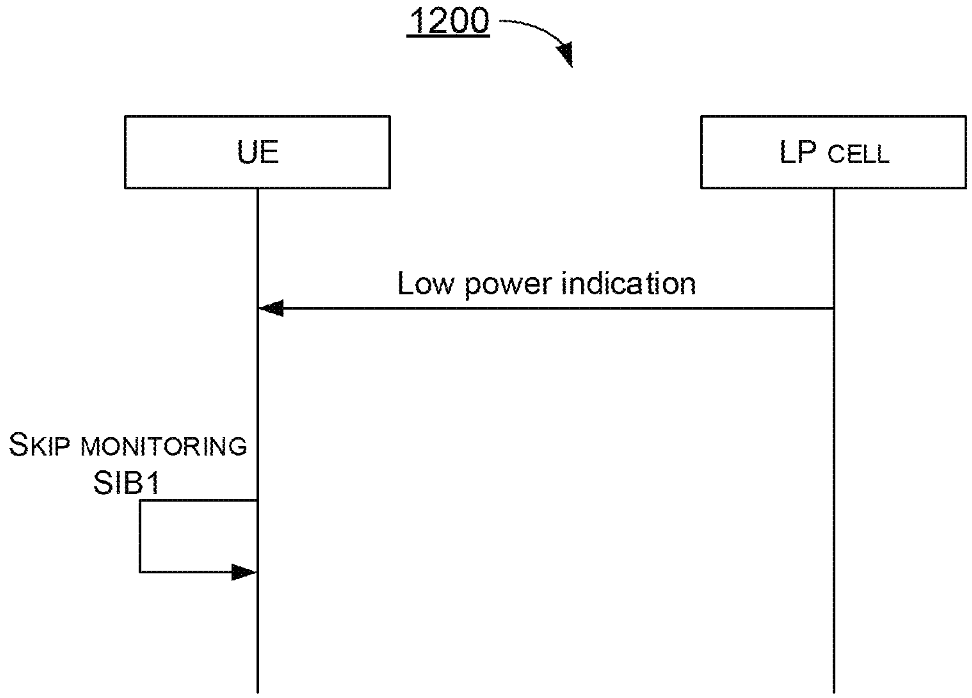
FIG. 12 is a diagram depicting an example scenario of extending SIB1 period under schemes in accordance with implementations of the present disclosure.

FIG. 12 illustrates an example scenario 1200 of extending SIB1 period under schemes in accordance with implementations of the present disclosure. Scenario 1200 involves a LP cell and a UE, which may be a part of a wireless communication network (e.g., an LTE network, a 5G/NR network, an IoT network or a 6G network). Scenario 1200 illustrates an example on extending SIB1 period. For SSB and CORESET multiplexing pattern 1, the UE may receive a low power indication (LPI) in system information, e.g., SIB1. If the LPI is present, a periodicity and repetitions of SIB1 may be configurable or be the same as the SSB period, rather than the default value of 20 ms for the repetition transmission period. Furthermore, if the LPI is present, the UE may stop (or skip) monitoring SIB1 every 20 ms and follow the new configuration or association provided by the network node. For example, the UE may receive a configuration of the SIB1 repetition in system information when the LPI is present in the SI. The UE may monitor SIB1 based on the configured periodicity rather than the default value of 20 ms to support soft combining. In another example, the SIB1 repetition or the SSB repetition may be provided in the frequency domain. The related configuration could be found in the system information. The UE may be provided a SIB1 PDCCH monitoring window associated with an SSB.

A normal cell may decide to enter the energy-saving state (ESS) for energy savings when the normal cell detects that its traffic load is below a certain threshold. The core network or the network node may initiate the ESS activation procedure.

If the core network initiates the ESS activation procedure, the network node may receive a threshold as a trigger point. For example, if the cell traffic load is below the trigger point, the network node may send an indication (e.g., LPI) to the core network. If the core network receives the indication, the core network may send permission to the network node to initiate the ESS activation procedure.

If the network node initiates the ESS activation procedure, the network node may initial the ESS activation procedure when the cell traffic load is below the threshold provided by the core network. The network node may send an indication (e.g., LPI) to inform the core network.

The LP cell may decide to leave the energy-saving state (ESS) to provide service when the LP cell detects that its traffic load is above a certain threshold. The core network or the network node may initiate the ESS deactivation procedure.

If the core network initiates the ESS deactivation procedure, the network node may receive a threshold as a trigger point. For example, if the cell traffic load is above the trigger point, the network node may send an indication (e.g., Non-LPI) to the core network. If the core network receives the indication, the core network may send permission to the network node to initiate the ESS deactivation procedure.

If the network node initiates the ESS deactivation procedure, the network node may initial the ESS deactivation procedure when the cell traffic load is above the threshold provided by the core network. The network node may send an indication (e.g., Non-LPI) to inform the core network.

However, UE behavior in the ESS is unclear. The UE may determine whether to access a cell operated in the ESS. If the UE is served by the cell in ESS, the UE may enable additional power-saving schemes to prevent power waste.

Figure 13:
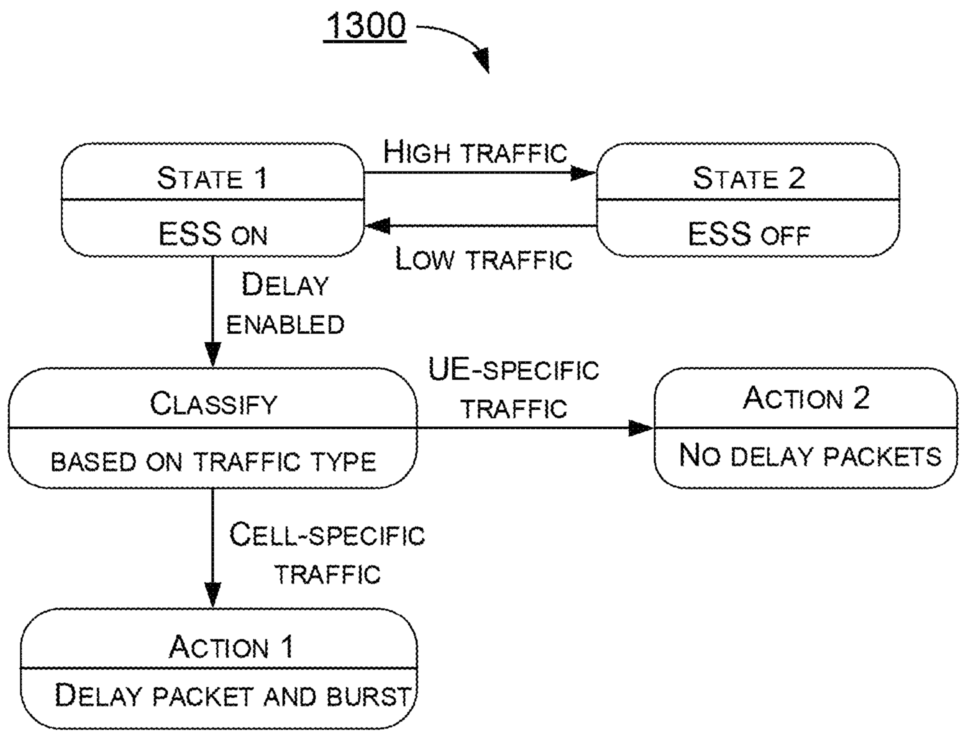
FIG. 13 is a diagram depicting an example scenario of switching ESS under schemes in accordance with implementations of the present disclosure.

FIG. 13 illustrates an example scenario 1300 of switching ESS under schemes in accordance with implementations of the present disclosure. Scenario 1300 involves a plurality of network nodes and a UE, which may be a part of a wireless communication network (e.g., an LTE network, a 5G/NR network, an IoT network or a 6G network). Scenario 1300 illustrates an example on ESS. In the ESS, the network node may delay packets and burst to save its energy. The network node may classify the traffics based on their timing requirements (e.g., high traffic or low traffic). The traffic with low timing requirements (i.e., low traffic) may be delayed and be buffered to enter a sleep state (i.e., state 1: ESS on). In addition, the network node may classify the traffics based on the traffic types of traffics (e.g., cell-specific traffic or UE-specific traffic). For example, the network node may delay all cell-specific traffic (e.g., SIB2, SIB4, and other system information) (i.e., Action 1), but guarantee UE-specific traffic (i.e., Action 2) to save energy.

Figure 14:
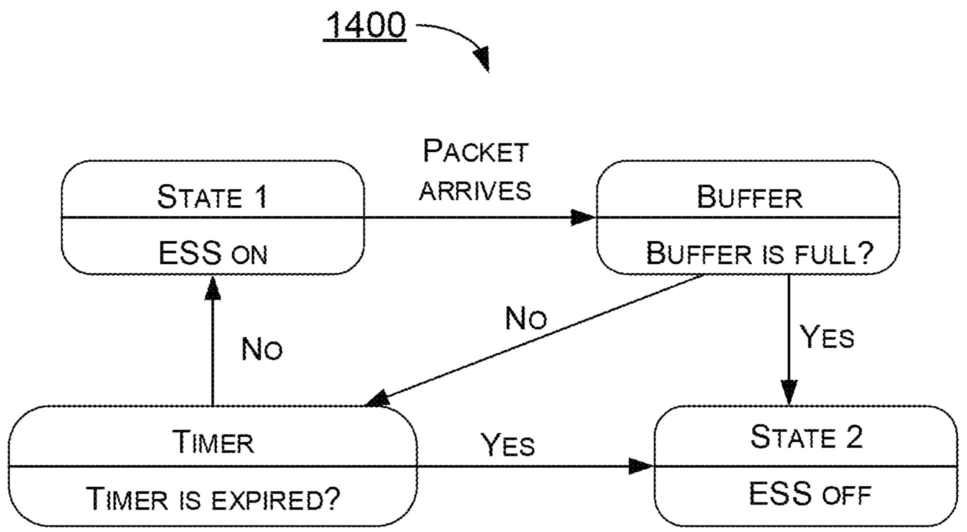
FIG. 14 is a diagram depicting an example scenario of a timer for ESS under schemes in accordance with implementations of the present disclosure.

FIG. 14 illustrates an example scenario 1400 of a timer for ESS under schemes in accordance with implementations of the present disclosure. Scenario 1400 involves a plurality of network nodes and a UE, which may be a part of a wireless communication network (e.g., an LTE network, a 5G/NR network, an IoT network or a 6G network). Scenario 1400 illustrates an example on a timer for ESS. On top of traffic load, e.g., a number of packets arrived and a buffer is full, a timer may be used as the maximum duration. The network node may stay in the ESS (i.e., state 1) until the timer is expired. If the buffer is not full or the timer is expired, the network node may leave ESS (i.e., state 2).

Figure 15:
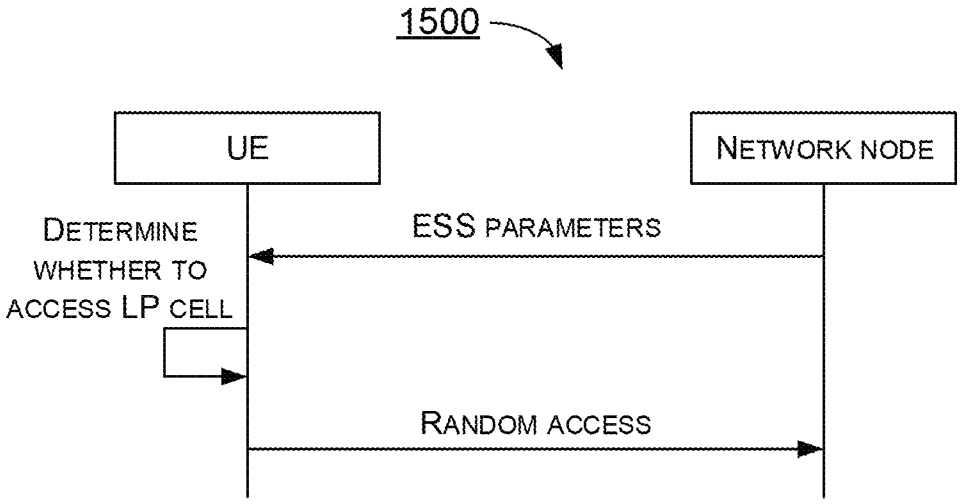
FIG. 15 is a diagram depicting an example scenario of an access procedure for ESS under schemes in accordance with implementations of the present disclosure.

FIG. 15 illustrates an example scenario 1500 of an access procedure for ESS under schemes in accordance with implementations of the present disclosure. Scenario 1500 involves a network node and a UE, which may be a part of a wireless communication network (e.g., an LTE network, a 5G/NR network, an IoT network or a 6G network). Scenario 1500 illustrates an example on an access procedure for ESS. The LP cell may broadcast the following assistant information for the UE to perform cell selection and cell reselection. The assistant information (e.g., ECC parameters) may comprise at least one of an LPI indicates whether the LP cell is in the ESS, the maximum packet delay used in the ESS, the maximum time duration used in the ESS, and the traffic type would be delayed in the ESS. The UE may use the assistant information to determine cell selection priority and cell reselection priority. In addition, based on the assistant information, the UE may determine whether to access the LP cell. For example, the UE may enter a sleeping mode when there is an expected waiting time for SSB or PRACH occasion. The sleeping mode is triggered by the UE and configured by the network node. The configuration configured by the network node may include sleeping duration, on and off, etc.

The LP cell may reduce the contention-based RA (CBRA) capacity. The PRACH configuration has an association with SSB indexes. When the SSB period is 160 ms, only one PRACH configuration can be provided. Thus, additional delay is introduced when CBRA is needed.

In addition, for automatic gain control (AGC) training, the 160 ms may not be suitable for the SSB-based AGC training. The fine time tracking and AGC adjustment may delay 160 ms for an SCell activation. Thus, additional delay is introduced when SCell addition is needed.

In addition, for mobility, the handover and beam management (BM) procedures may introduce additional delay due to the long SSB period. For example, T_first-SSB is the time to first SSB transmission, which could be 160 ms according to the SSB period. T_IU is the delay in acquiring the first available PRACH in target, which could be 90 ms when the SSB period is equal to 160 ms.

In addition, for T_first-SSB is beam switching, additional latency for beam switching is needed for applying a new Transmission Configuration Indicator (TCI) state.

In order to solve the above issues for additional delay or additional latency. The present disclosure proposes some solutions to resolve the issues below.

Figure 16:
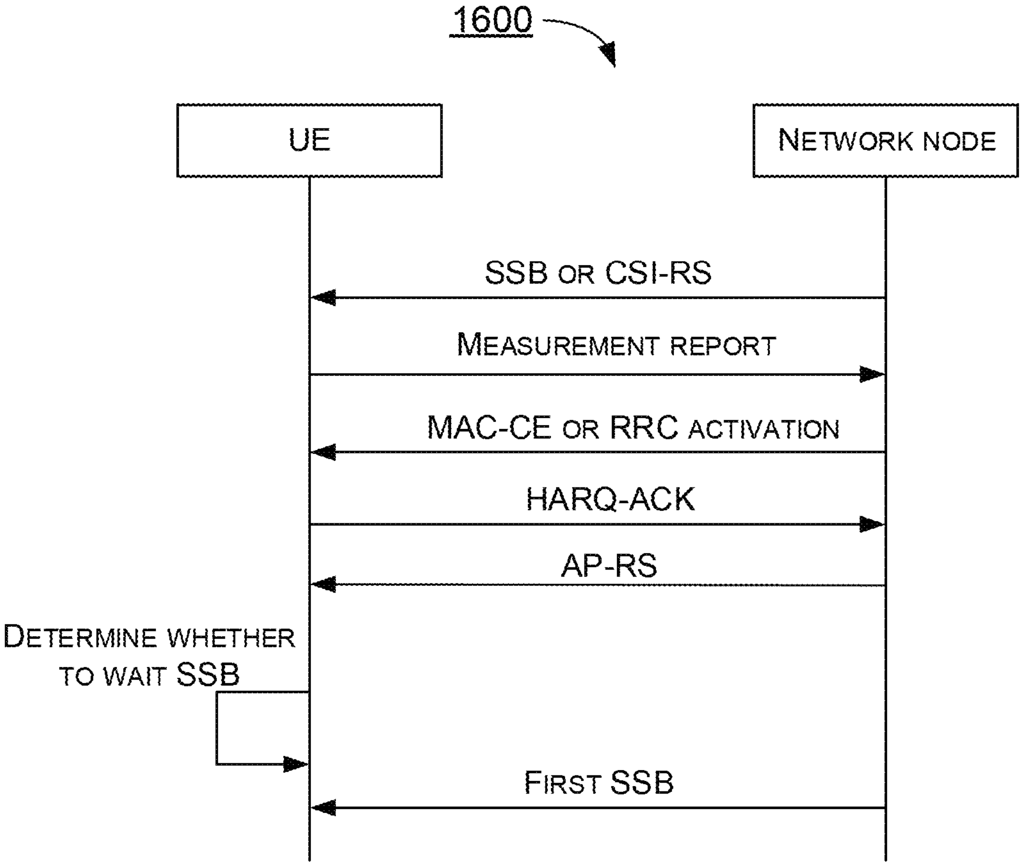
FIG. 16 is a diagram depicting an example scenario of reducing delay by AP-RS under schemes in accordance with implementations of the present disclosure.

FIG. 16 illustrates an example scenario 1600 of reducing delay by aperiodic reference signal (AP-RS) under schemes in accordance with implementations of the present disclosure. Scenario 1600 involves a network node and a UE, which may be a part of a wireless communication network (e.g., an LTE network, a 5G/NR network, an IoT network or a 6G network). Scenario 1600 illustrates an example on reducing delay by the AP-RS. After receiving transmission configuration indication (TCI) activation, handover command, or SCell activation, and before receiving the first SSB transmission, the UE may receive an AP-RS, e.g., aperiodic tracking reference signal (A-TRS), to reduce the waiting time for the first SSB transmission. If the UE does not receive an AP-RS, the UE may use the first SSB. The AP-RS may be activated via a downlink control information (DCI) format or a MAC-CE and pre-configured via an RRC message. The DCI format may be sent after the UE has transmitted HARQ-ACK information according to the activation command or the HO command. The AP-RS may be associated with the TCI activation, handover command, or SCell activation. For example, a HO command may provide an AP-RS ID, which may indicate whether the UE could skip the first SSB transmission if the specific AP-RS can be found. The AP-RS may include parameters, e.g., Serving Cell ID, bandwidth part (BWP) ID, Channel-State-Information Reference-Signal (CSI-RS) resource set ID, CSI-interference measurement (IM) resource set ID, TCI State ID, CORESET Pool ID, Reserved bit, etc. For example, the AP-RS may be associated with the LPI, which indicates that the serving cell has a long period of SSB. If the LPI is received, the UE may enter a sleeping mode during the waiting time for the first SSB if the first SSB cannot be skipped or replaced.

Figure 17:
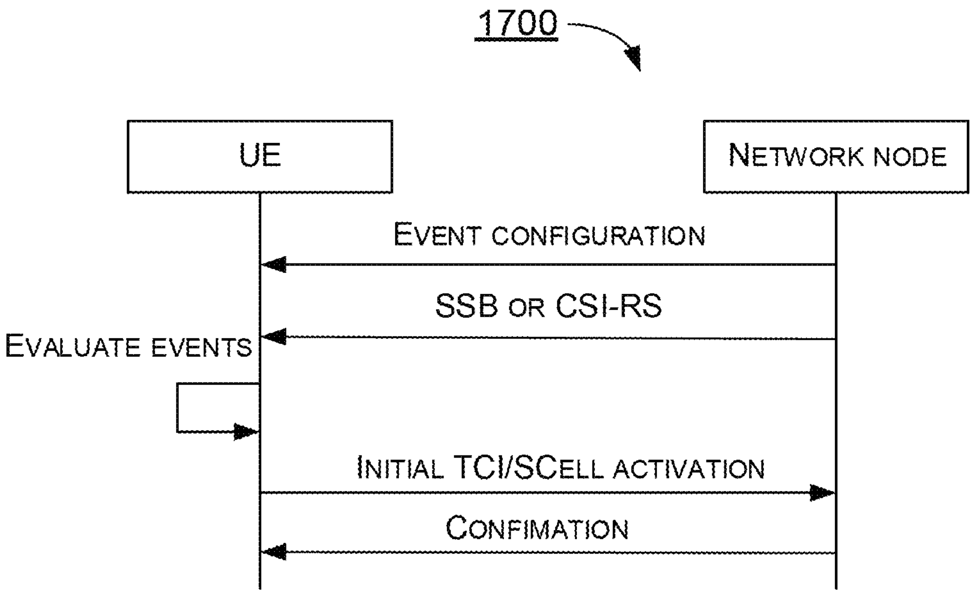
FIG. 17 is a diagram depicting an example scenario of reducing delay by event-based configuration under schemes in accordance with implementations of the present disclosure.

FIG. 17 illustrates an example scenario 1700 of reducing delay by event-based configuration under schemes in accordance with implementations of the present disclosure. Scenario 1700 involves a network node and a UE, which may be a part of a wireless communication network (e.g., an LTE network, a 5G/NR network, an IoT network or a 6G network). Scenario 1700 illustrates an example on reducing delay by event-based configuration. The UE may initial the TCI activation, HO, SCell activation based on the measurement results from SSB and CSI-RS. The initiation and the events may be pre-configured by network node via RRC messages (e.g., the RRC messages may include event configurations, SSB and CSI-RS). For example, in an event that the RSRP measurement is above a given threshold of RSRP, the UE may initiate the procedure of TCI activation, HO, or SCell activation based on the measurement results from SSB and CSI-RS. The network node may confirm the UE-initiated procedure via a DCI format, MAC-CE or RRC message. The UE may report a selected SSB ID or a selected SCell ID for the initiation.

Figure 18:
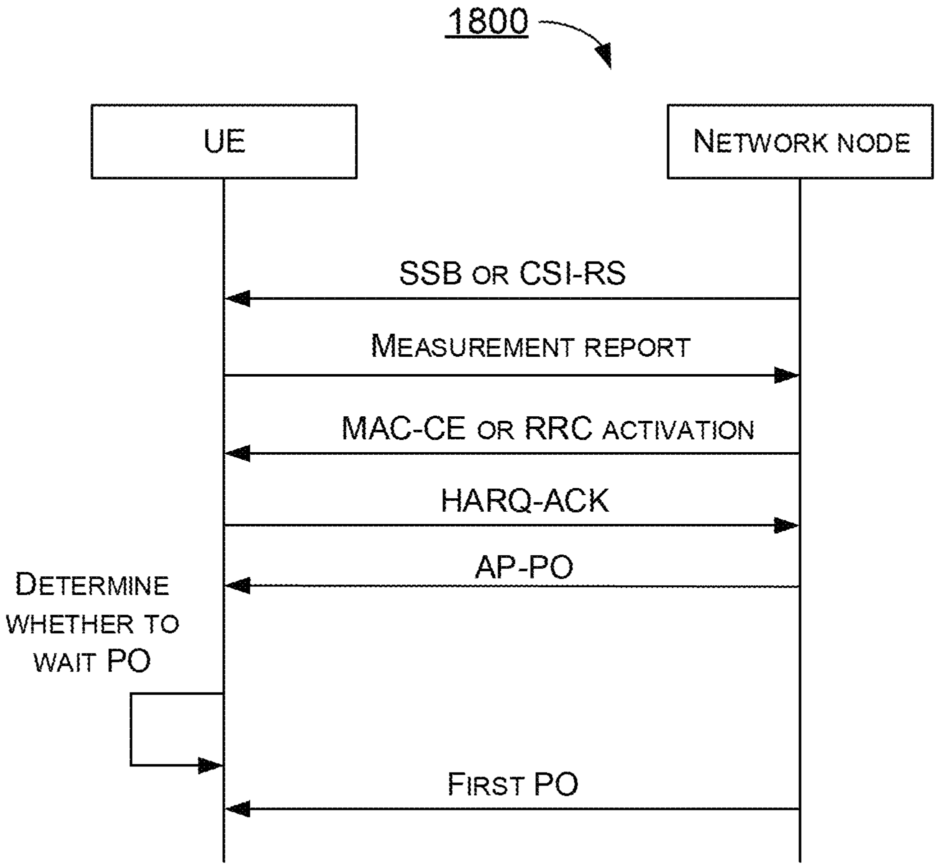
FIG. 18 is a diagram depicting an example scenario of reducing delay by AP-PO under schemes in accordance with implementations of the present disclosure.

FIG. 18 illustrates an example scenario 1800 of reducing delay by aperiodic PRACH occasion (AP-PO) under schemes in accordance with implementations of the present disclosure. Scenario 1800 involves a network node and a UE, which may be a part of a wireless communication network (e.g., an LTE network, a 5G/NR network, an IoT network or a 6G network). Scenario 1800 illustrates an example on reducing delay by AP-PO. After receiving the handover command and before receiving the first available PRACH occasion, the UE may receive an aperiodic PRACH occasion (AP-PO) to reduce the waiting time for the first PO occasion. If the UE does not receive an AP-PO, the UE may use the first PO. The AP-PO may be activated via a DCI format or a MAC-CE and pre-configured via an RRC message. The DCI format is sent after UE has transmitted HARQ-ACK information according to the activation command or the HO command. The AP-PO may be associated with the handover command. For example, a HO command may provide an AP-PO ID, indicating whether UE could skip the first PO occasion if this specific AP-PO can be found. The AP-PO may indicate PO parameters, e.g., prach-ConfigurationIndex, msgA-PRACH-ConfigurationIndex, preambleReceivedTargetPower, msgA-PreambleReceivedTargetPower, rsrp-ThresholdSSB, rsrp-ThresholdCSI-RS, msgA-RSRP-ThresholdSSB, rsrp-ThresholdSSB-SUL, msgA-RSRP-Threshold, msgA-TransMax, ra-PreambleIndex, ra-ssb-OccasionMaskIndex, msgA-SSB-SharedRO-MaskIndex, etc. For example, the AP-PO may be associated with the LPI, which indicates that the serving cell has a long period of PO. If the LPI is received, the UE may enter a sleeping mode during the waiting time for the first PO if the first PO cannot be skipped or replaced.

The UE may assume a periodicity of 160 ms for SSB for initial cell selection. Furthermore, the UE may support an SSB period of 320, 640, and 1280 ms if the UE fulfills the low-mobility evaluation, the not-at-the-cell edge evaluation, or the low-power state evaluation. The low-mobility evaluation, the not-at-the-cell edge evaluation, and the low-power state evaluation may be provided in SIB2 or SIB4 from the serving cell. The low-mobility evaluation, the not-at-the-cell edge evaluation, and the low-power state evaluation may include s-SearchDeltaP and t-SearchDeltaP. The t-SearchDeltaP may specify the time period over which the Srxlev variation is evaluated for relaxed measurement, and the s-SearchDeltaP may specify the threshold (in dB) on Srxlev variation for relaxed measurement.

Figure 19:
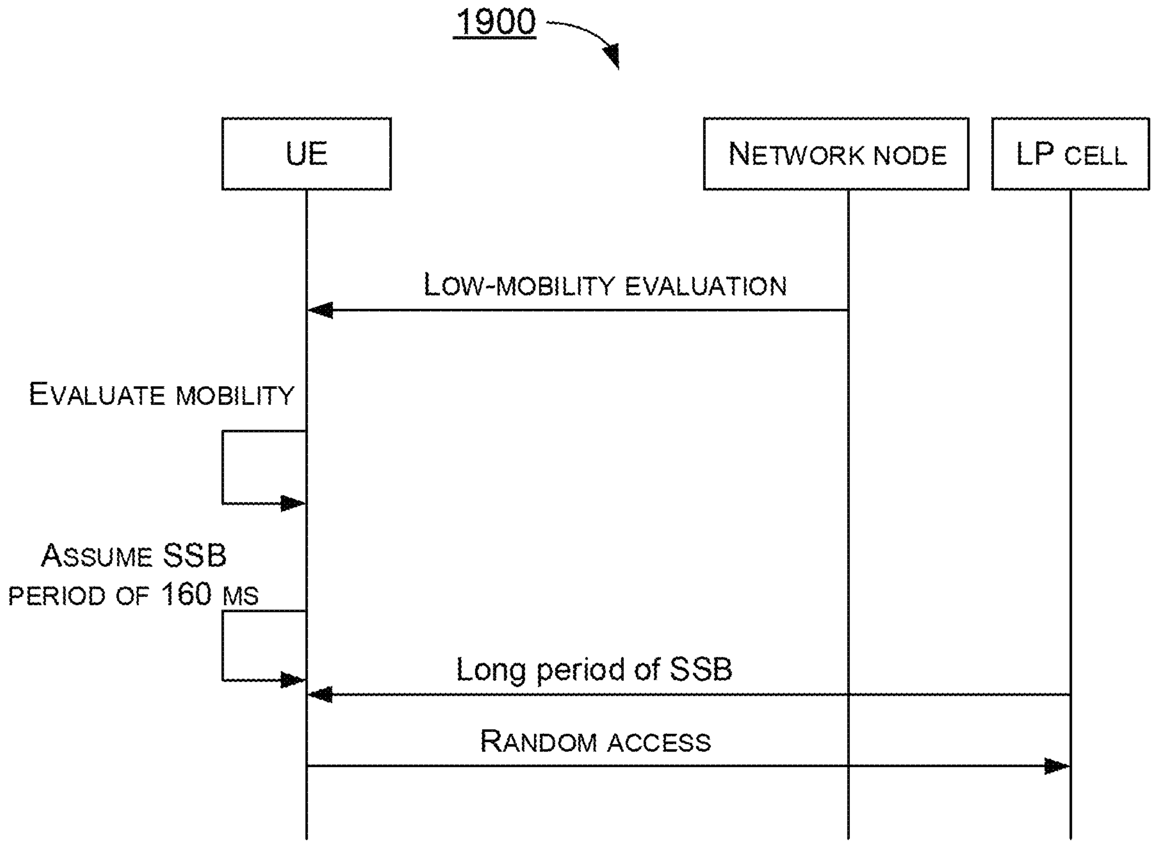
FIG. 19 is a diagram depicting an example scenario of low-mobility evaluation under schemes in accordance with implementations of the present disclosure.

FIG. 19 illustrates an example scenario 1900 of low-mobility evaluation under schemes in accordance with implementations of the present disclosure. Scenario 1900 involves a plurality of network nodes and a UE, which may be a part of a wireless communication network (e.g., an LTE network, a 5G/NR network, an IoT network or a 6G network). Scenario 1900 illustrates an example on low-mobility evaluation. The low-mobility evaluation, the not-at-the-cell edge evaluation, and the low-power state evaluation may be used to determine whether the UE is allowed to access an LP cell.

The LP cell may provide the remaining time for staying in the energy-saving state. The UE may determine whether to access the LP cell based on the remaining time information.

When the UE changes the assumption of the SSB period to 160 ms, the UE may start a timer. When the timer runs, the UE assumes 160 ms for the SSB period. When the timer expires, the UE may change back to the default assumption of the SSB period of 20 ms.

When the UE enters the low-mobility state or the not-at-the-cell-edge state, UE may start a timer. When the timer runs, UE is in the low-mobility or the not-at-the-cell-edge state. When the timer expires, the UE may change back to the default state. The timer value may be provided in SIB from the network node.

Illustrative Implementations

Figure 20:
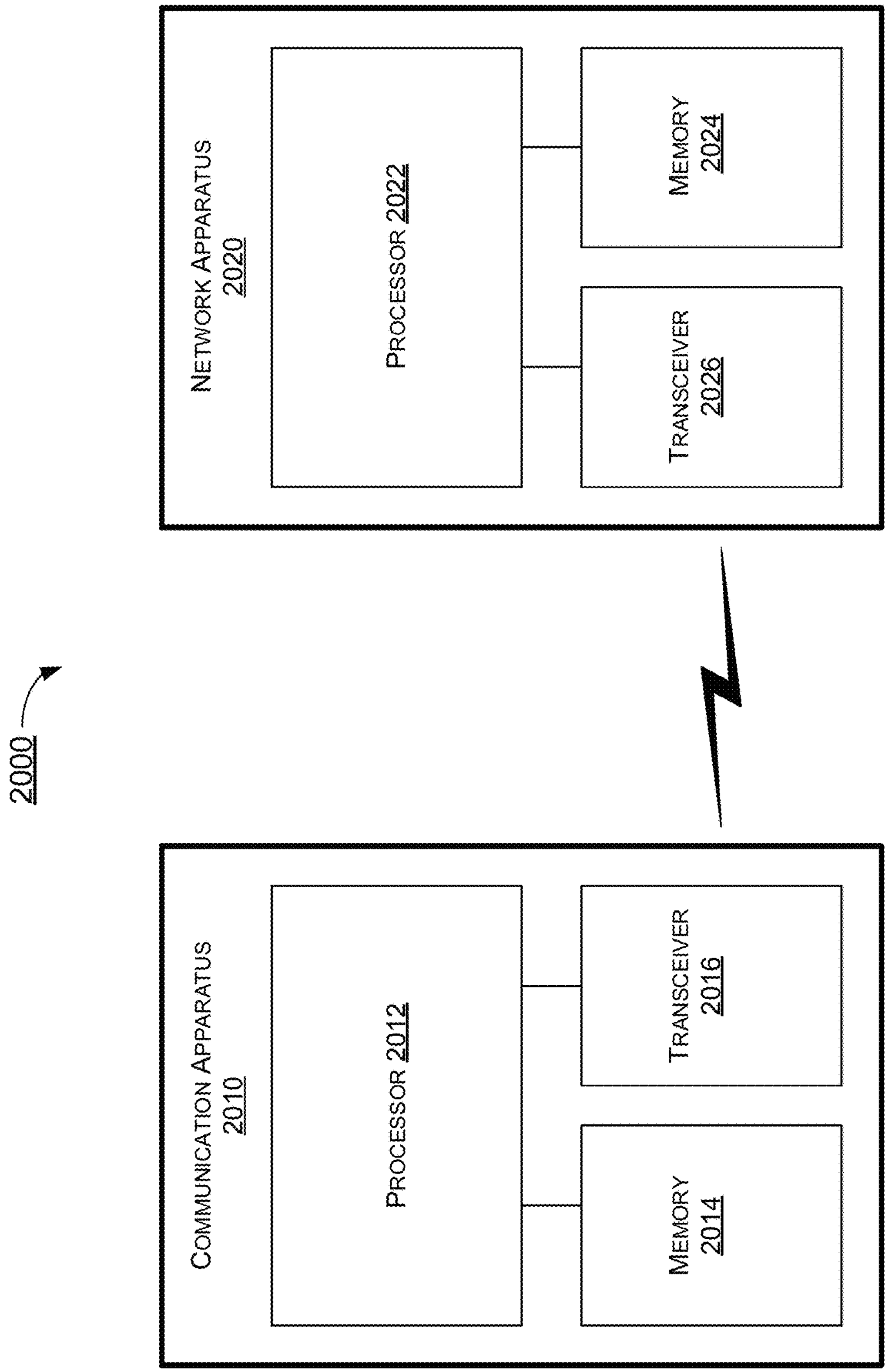
FIG. 20 is a block diagram of an example communication system in accordance with an implementation of the present disclosure.

FIG. 20 illustrates an example communication system 2000 having an example communication apparatus 2010 and an example network apparatus 2020 in accordance with an implementation of the present disclosure. Each of communication apparatus 2010 and network apparatus 2020 may perform various functions to implement schemes, techniques, processes and methods described herein pertaining to accessing LP cells for network energy saving with respect to user equipment and network apparatus in mobile communications, including scenarios/schemes described above as well as processes 2100 and 2200 described below.

Communication apparatus 2010 may be a part of an electronic apparatus, which may be a UE such as a portable or mobile apparatus, a wearable apparatus, a wireless communication apparatus or a computing apparatus. For instance, communication apparatus 2010 may be implemented in a smartphone, a smartwatch, a personal digital assistant, a digital camera, or a computing equipment such as a tablet computer, a laptop computer or a notebook computer. Communication apparatus 2010 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 2010 may be implemented in a smart thermostat, a smart fridge, a smart door lock, a wireless speaker or a home control center. Alternatively, communication apparatus 2010 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 2010 may include at least some of those components shown in FIG. 20 such as a processor 2012, for example. Communication apparatus 2010 may further include one or more other components not pertinent to the proposed scheme of the present disclosure (e.g., internal power supply, display device and/or user interface device), and, thus, such component(s) of communication apparatus 2010 are neither shown in FIG. 20 nor described below in the interest of simplicity and brevity.

Network apparatus 2020 may be a part of a network apparatus, which may be a network node such as a satellite, a base station, a small cell, a router or a gateway. For instance, network apparatus 2020 may be implemented in an eNodeB in an LTE network, in a gNB in a 5G/NR, IoT, NB-IoT or IIoT network or in a satellite or base station in a 6G network. Alternatively, network apparatus 2020 may be implemented in the form of one or more IC chips such as, for example and without limitation, one or more single-core processors, one or more multi-core processors, or one or more RISC or CISC processors. Network apparatus 2020 may include at least some of those components shown in FIG. 20 such as a processor 2022, for example. Network apparatus 2020 may further include one or more other components not pertinent to the proposed scheme of the present disclosure (e.g., internal power supply, display device and/or user interface device), and, thus, such component(s) of network apparatus 2020 are neither shown in FIG. 20 nor described below in the interest of simplicity and brevity.

In one aspect, each of processor 2012 and processor 2022 may be implemented in the form of one or more single-core processors, one or more multi-core processors, or one or more CISC processors. That is, even though a singular term "a processor" is used herein to refer to processor 2012 and processor 2022, each of processor 2012 and processor 2022 may include multiple processors in some implementations and a single processor in other implementations in accordance with the present disclosure. In another aspect, each of processor 2012 and processor 2022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2012 and processor 2022 is a special-purpose machine specifically designed, arranged and configured to perform specific tasks including autonomous reliability enhancements in a device (e.g., as represented by communication apparatus 2010) and a network (e.g., as represented by network apparatus 2020) in accordance with various implementations of the present disclosure.

In some implementations, communication apparatus 2010 may also include a transceiver 2016 coupled to processor 2012 and capable of wirelessly transmitting and receiving data. In some implementations, communication apparatus 2010 may further include a memory 2014 coupled to processor 2012 and capable of being accessed by processor 2012 and storing data therein. In some implementations, network apparatus 2020 may also include a transceiver 2026 coupled to processor 2022 and capable of wirelessly transmitting and receiving data. In some implementations, network apparatus 2020 may further include a memory 2024 coupled to processor 2022 and capable of being accessed by processor 2022 and storing data therein. Accordingly, communication apparatus 2010 and network apparatus 2020 may wirelessly communicate with each other via transceiver 2016 and transceiver 2026, respectively. To aid better understanding, the following description of the operations, functionalities and capabilities of each of communication apparatus 2010 and network apparatus 2020 is provided in the context of a mobile communication environment in which communication apparatus 2010 is implemented in or as a communication apparatus or a UE and network apparatus 2020 is implemented in or as a network node of a communication network.

In some implementations, processor 2012 may receive at least one information associated with an LP cell from network apparatus 2020 in a normal cell. Processor 2012 may perform an SSB-based measurement according to the information to detect the LP cell. Processor 2012 may perform an access procedure with the LP cell.

In some implementations, processor 2012 may establish a RRC connection with the normal cell. Processor 2012 may obtain at least one RRC message with the information associated with the LP cell from network apparatus 2020. Processor 2012 may transmit, via transceiver 2016, a measurement report to network apparatus 2020. Processor 2012 may receive, via transceiver 2016, access information from network apparatus 2020. Processor 2012 may perform the access procedure with the LP cell based on the access information from network apparatus 2020.

In some implementations, in an event that the normal cell and LP cell are in the same frequency region, the at least one RRC message comprises measurement configuration, and wherein the measurement configuration comprises a first SMTC and a second SMTC.

In some implementations, in an event that the normal cell and LP cell are in different frequency regions, the at least one RRC message comprises measurement gap configuration, and wherein the measurement gap configuration comprises different gap information with different periodicities.

In some implementations, the access information comprises at least one of HO message, SCell addition message, and DC message.

In some implementations, processor 2012 may camp on the normal cell. Processor 2012 may obtain system information with the information associated with the LP cell from network apparatus 2020 from the normal cell. Processor 2012 may receive, via transceiver 2016, at least one reference signal from the LP cell. Processor 2012 may perform a random access process procedure for the access procedure with the LP cell. In some implementations, the system information comprises cell re-selection information for intra-frequency cell selection or cell re-selection information for inter-frequency cell selection. In some implementations, the random access process comprises a Type-1 random process procedure or a Type-2 random process procedure.

In some implementations, processor 2012 may obtain an SSB from the normal cell or the LP cell.

In some implementations, processor 2012 may receive, via transceiver 2016, a long-period indication (LPI). Processor 2012 may skip monitoring a MIB based on the LPI.

In some implementations, processor 2012 may obtain a low power indication (LPI). Processor 2012 may skip monitoring a SIB1 based on the LPI.

In some implementations, processor 2012 may obtain an indication for an inter-RAT concurrent gap. Processor 2012 may perform an inter-RAT measurement based on the indication.

In some implementations, processor 2012 may obtain a pre-configuration for an inter-RAT concurrent gap. Processor 2012 may activate the inter-RAT concurrent gap via an UL MAC CE or an UL RRC message.

In some implementations, processor 2012 may receive, via transceiver 2016, assistant information associated with an ESS from the LP cell. Processor 2012 may determine whether to perform a cell selection procedure, a cell reselection procedure or the access procedure with the LP cell based on the assistant information.

In some implementations, processor 2012 may receive, via transceiver 2016, an AP-RS. Processor 2012 may determine whether to wait an SSB based on the AP-RS.

In some implementations, processor 2012 may determine whether to perform a TCI activation, a HO or a SCell activation based on a trigger event. Processor 2012 may perform the TCI activation, the HO or the SCell activation in an event that the trigger event is satisfied.

In some implementations, processor 2012 may receive, via transceiver 2016, an AP-PO. Processor 2012 may determine whether to wait a PO based on the AP-PO.

In some implementations, processor 2012 may obtain an evaluation information. Processor 2012 may perform an evaluation based on the evaluation information to determine whether to access the LP cell. A periodicity of the LP cell is larger than or equal to a pre-determined value.

In some implementations, processor 2022 may establish a connection with communication apparatus 2010 in a normal cell. Processor 2022 may transmit, via transceiver 2016, at least one information associated with a LP cell to communication apparatus 2010 for performing an access procedure with the LP cell.

In some implementations, processor 2022 may establish RRC connection with communication apparatus 2010. Processor 2022 may provide at least one RRC message with the information at least associated with the LP cell to communication apparatus 2010. Processor 2022 may receive, via transceiver 2016, a measurement report from communication apparatus 2010. Processor 2022 may transmit, via transceiver 2016, access information for the access procedure with the LP cell to communication apparatus 2010 based on the measurement report.

Illustrative Processes

Figure 21:
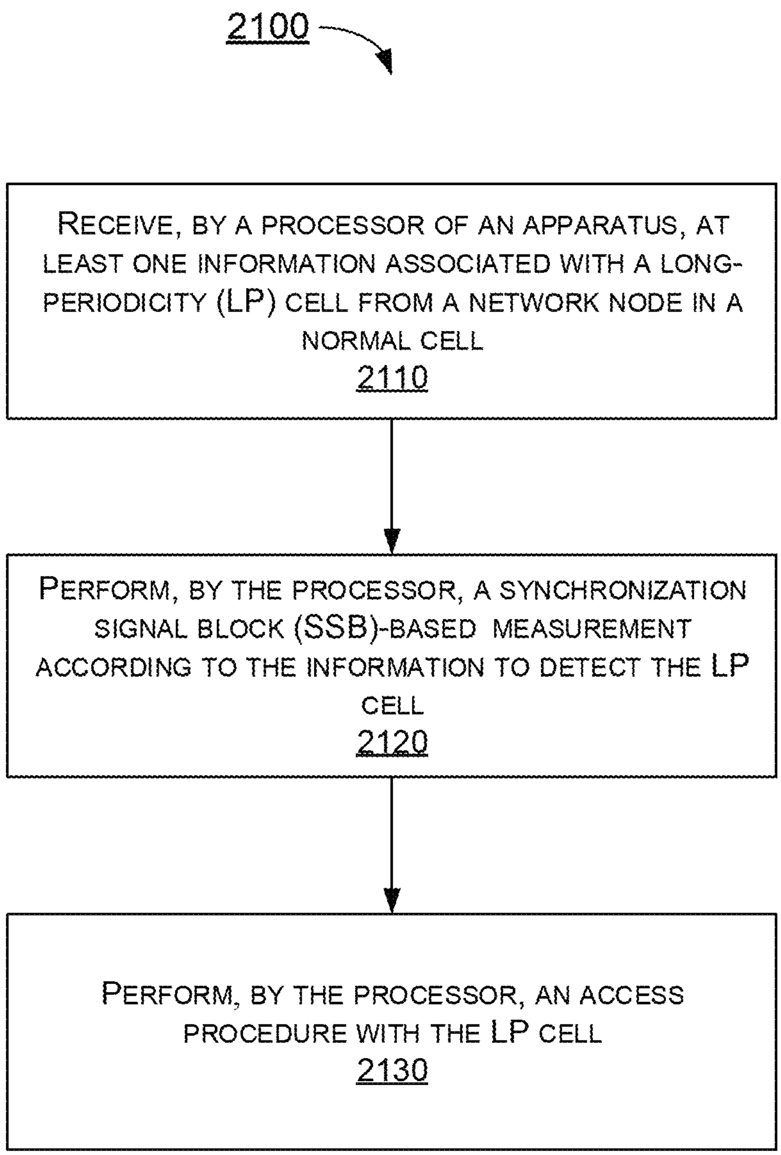
FIG. 21 is a flowchart of an example process in accordance with an implementation of the present disclosure.

FIG. 21 illustrates an example process 2100 in accordance with an implementation of the present disclosure. Process 2100 may be an example implementation of above scenarios/schemes, whether partially or completely, with respect to accessing LP cells for network energy saving with the present disclosure. Process 2100 may represent an aspect of implementation of features of communication apparatus 2010. Process 2100 may include one or more operations, actions, or functions as illustrated by one or more of blocks 2110, 2120 and 2130. Although illustrated as discrete blocks, various blocks of process 2100 may be divided into additional blocks, combined into fewer blocks, or eliminated, depending on the desired implementation. Moreover, the blocks of process 2100 may be executed in the order shown in FIG. 21 or, alternatively, in a different order. Process 2100 may be implemented by communication apparatus 2010 or any suitable UE or machine type devices. Solely for illustrative purposes and without limitation, process 2100 is described below in the context of communication apparatus 2010. Process 2100 may begin at block 2110.

At 2110, process 2100 may involve processor 2012 of communication apparatus 2010 receiving at least one information associated with an LP cell from a network node in a normal cell. Process 2100 may proceed from 2110 to 2120.

At 2120, process 2100 may involve processor 2012 performing an SSB-based measurement according to the information to detect the LP cell. Process 2100 may proceed from 2120 to 2130.

At 2130, process 2100 may involve processor 2012 performing an access procedure with the LP cell.

Figure 22:
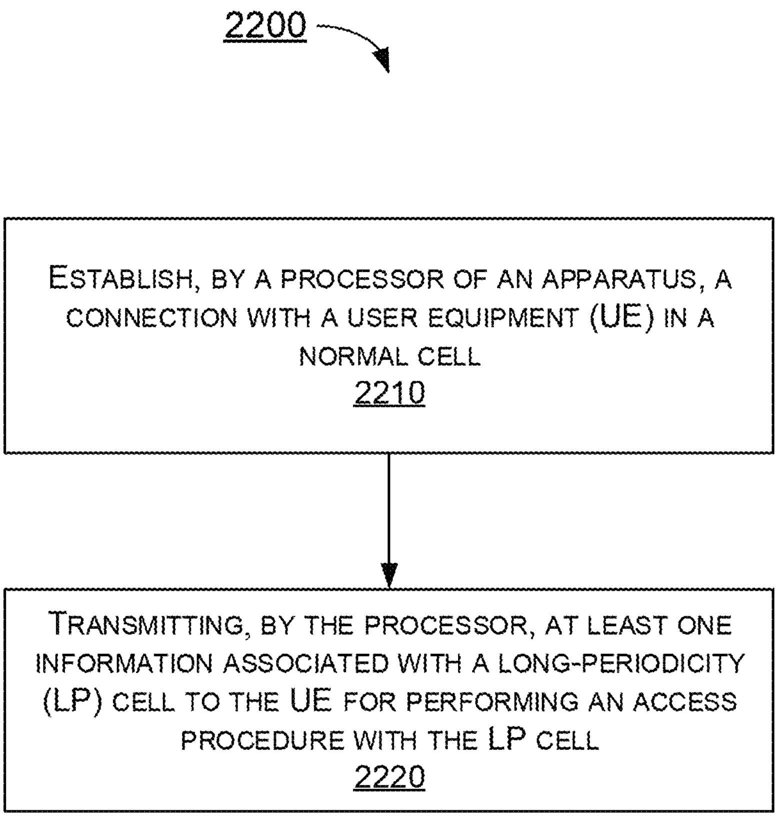
FIG. 22 is a flowchart of an example process in accordance with an implementation of the present disclosure.

FIG. 22 illustrates an example process 2200 in accordance with an implementation of the present disclosure. Process 2200 may be an example implementation of above scenarios/schemes, whether partially or completely, with respect to accessing LP cells for network energy saving with the present disclosure. Process 2200 may represent an aspect of implementation of features of network apparatus 2020. Process 2200 may include one or more operations, actions, or functions as illustrated by one or more of blocks 2210 and 2220. Although illustrated as discrete blocks, various blocks of process 2200 may be divided into additional blocks, combined into fewer blocks, or eliminated, depending on the desired implementation. Moreover, the blocks of process 2200 may be executed in the order shown in FIG. 22 or, alternatively, in a different order. Process 2200 may be implemented by network apparatus 2020 or any base stations or network nodes. Solely for illustrative purposes and without limitation, process 2200 is described below in the context of network apparatus 2020. Process 2200 may begin at block 2210.

At 2210, process 2200 may involve processor 2022 of network apparatus 2020 establishing a connection with a UE in a normal cell. Process 2200 may proceed from 2210 to 2220.

At 2220, process 2200 may involve processor 2022 transmitting at least one information associated with an LP cell to the UE for performing an access procedure with the LP cell.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

establishing, by a processor of an apparatus, a radio resource control (RRC) connection with a normal cell;

obtaining, by the processor, at least one RRC message with information associated with a long-periodicity (LP) cell from a network node in the normal cell;

performing, by the processor, a synchronization signal block (SSB)-based measurement according to the information to detect the LP cell;

transmitting, by the processor, a measurement report to the network node;

receiving, by the processor, access information from the network node; and performing, by the processor, an access procedure with the LP cell based on the access information from the network node.

2. The method of claim 1, wherein in an event that the normal cell and LP cell are in the same frequency region, the at least one RRC message comprises measurement configuration, and wherein the measurement configuration comprises a first SSB-based measurement timing configuration (SMTC) and a second SMTC.

3. The method of claim 1, wherein in an event that the normal cell and LP cell are in different frequency regions, the at least one RRC message comprises measurement gap configuration, and wherein the measurement gap configuration comprises different gap information with different periodicities.

4. The method of claim 1, wherein the access information comprises at least one of handover (HO) message, secondary cell (SCell) addition message, and dual-connectivity (DC) message.

5. The method of claim 1, further comprising:

camping on, by the processor, the normal cell;

obtaining, by the processor, system information with the information associated with the LP cell from the network node from the normal cell;

receiving, by the processor, at least one reference signal from the LP cell; and/or performing, by the processor, a random access process procedure for the access procedure with the LP cell.

6. The method of claim 5, wherein the system information comprises cell re-selection information for intra-frequency cell selection or cell re-selection information for inter-frequency cell selection.

7. The method of claim 5, wherein the random access process comprises a Type-1 random process procedure or a Type-2 random process procedure.

8. The method of claim 1, wherein further comprising:

obtaining, by the processor, an SSB from the normal cell or the LP cell.

9. The method of claim 1, further comprising:

receiving, by the processor, a low power indication (LPI); and skipping, by the processor, monitoring a master information block (MIB) based on the LPI.

10. The method of claim 1, further comprising:

obtaining, by the processor, a low power indication (LPI); and skipping, by the processor, monitoring a system information block 1 (SIB1) based on the LPI.

11. The method of claim 1, further comprising:

obtaining, by the processor, an indication for an inter-radio access technology (RAT) concurrent gap; and performing, by the processor, an inter-RAT measurement based on the indication.

12. The method of claim 1, further comprising:

obtaining, by the processor, a pre-configuration for an inter-radio access technology (RAT) concurrent gap; and activating, by the processor, the inter-RAT concurrent gap via an uplink (UL) media access control (MAC) control element (MAC CE) or an UL RRC message.

13. The method of claim 1, further comprising:

receiving, by the processor, assistant information associated with an energy-saving state (ESS) from the LP cell; and determining, by the processor, whether to perform a cell selection procedure, a cell reselection procedure or the access procedure with the LP cell based on the assistant information.

14. The method of claim 1, further comprising:

receiving, by the processor, an aperiodic reference signal (AP-RS); and determining, by the processor, whether to wait an SSB based on the AP-RS.

15. The method of claim 1, further comprising:

determining, by the processor, whether to perform a transmission configuration indicator (TCI) activation, a handover (HO) or a secondary cell (SCell) activation based on a trigger event; and performing, by the processor, the TCI activation, the HO or the SCell activation in an event that the trigger event is satisfied.

16. The method of claim 1, further comprising:

receiving, by the processor, an aperiodic physical random access channel (PRACH) occasion (AP-PO); and determining, by the processor, whether to wait a PO based on the AP-PO.

17. The method of claim 1, further comprising:

obtaining, by the processor, an evaluation information; and performing, by the processor, an evaluation based on the evaluation information to determine whether to access the LP cell, wherein a periodicity of the LP cell is larger than or equal to a pre-determined value.

18. A method, comprising:

establishing, by a processor of an apparatus, a radio resource control (RRC) connection with a user equipment (UE) in a normal cell;

transmitting, by the processor, at least one RRC message with information associated with a long-periodicity (LP) cell to the UE for performing an access procedure with the LP cell;

receiving, by the processor, a measurement report from the UE; and transmitting, by the processor, access information for the access procedure with the LP cell to the UE based on the measurement report.

* * * * *